US010555393B1

(12) United States Patent
Fu et al.

(10) Patent No.: US 10,555,393 B1
(45) Date of Patent: *Feb. 4, 2020

(54) FACE RECOGNITION SYSTEMS WITH EXTERNAL STIMULUS

(71) Applicant: Kuna Systems Corporation, San Bruno, CA (US)

(72) Inventors: Sai-Wai Fu, Los Altos Hills, CA (US); Haomiao Huang, Redwood City, CA (US); Christopher Hiszpanski, San Francisco, CA (US)

(73) Assignee: KUNA SYSTEMS CORPORATION, San Bruno, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/252,841

(22) Filed: Jan. 21, 2019

Related U.S. Application Data

(63) Continuation of application No. 15/899,007, filed on Feb. 19, 2018, now Pat. No. 10,212,778, which is a (Continued)

(51) Int. Cl.
*F21S 8/00* (2006.01)
*F21S 8/04* (2006.01)
*H05B 33/08* (2006.01)
*H05B 37/02* (2006.01)
*H04W 4/02* (2018.01)
(Continued)

(52) U.S. Cl.
CPC .......... *H05B 33/0854* (2013.01); *F21S 8/033* (2013.01); *F21S 8/04* (2013.01); *H04W 4/02* (2013.01); *H05B 37/0227* (2013.01); *H05B 37/0272* (2013.01); *H05B 37/0281* (2013.01); (Continued)

(58) Field of Classification Search
CPC ................ H05B 33/08; H05B 33/0845; H05B 33/0854; H05B 37/02; H05B 37/0245; H05B 37/0227; H05B 37/0272; H05B 37/0281; F21S 8/033; F21S 8/04; H04W 4/02

See application file for complete search history.

(56) References Cited

U.S. PATENT DOCUMENTS 9,513,364 B2* 12/2016 Hall ...................... H04W 4/029
2012/0206050 A1* 8/2012 Spero ...................... B60Q 1/04
315/152

(Continued)

*Primary Examiner* — Thai Pham
(74) *Attorney, Agent, or Firm* — Christopher P. Maiorana, PC

(57) ABSTRACT

An apparatus includes a camera and a processor. The camera may be configured to capture video data. The processor may be configured to (A) process the video data, (B) generate control signals used to initiate a stimulus and (C) execute computer readable instructions. The computer readable instructions may be executed by the processor to perform video analysis on video frames of the captured video data to (a) detect a person, (b) detect context information associated with the detected person and (c) determine facial recognition results of the detected person. If the facial recognition results cannot detect a face of the detected person, the processor selects the stimulus from a plurality of stimuli. The stimulus may be selected in response to the context information to increase a probability of detecting a frontal view of the face of the detected person.

20 Claims, 13 Drawing Sheets

Related U.S. Application Data continuation of application No. 15/659,873, filed on Jul. 26, 2017, and a continuation of application No. 15/157,632, filed on May 18, 2016, now Pat. No. 9,832,933, and a continuation of application No. 15/611,975, filed on Jun. 2, 2017, now Pat. No. 10,117,309, which is a continuation of application No. 15/593,570, filed on May 12, 2017, now Pat. No. 10,462,341, which is a continuation of application No. 15/246,818, filed on Aug. 25, 2016, now Pat. No. 9,728,077, said application No. 15/611,975 is a continuation of application No. 15/498,866, filed on Apr. 27, 2017, now Pat. No. 10,136,037, and a continuation of application No. 15/214,866, filed on Jul. 20, 2016, now Pat. No. 9,992,389, and a continuation of application No. 14/881,275, filed on Oct. 13, 2015, now abandoned, which is a continuation of application No. 14/859,867, filed on Sep. 21, 2015, now Pat. No. 9,654,678, which is a continuation of application No. 14/664,275, filed on Mar. 20, 2015, now Pat. No. 9,726,338, and a continuation of application No. 14/504,632, filed on Oct. 2, 2014, now abandoned, and a continuation of application No. 14/519,642, filed on Oct. 21, 2014, now Pat. No. 10,289,917, and a continuation of application No. 14/205,946, filed on Mar. 12, 2014, now Pat. No. 9,542,832, and a continuation of application No. 14/164,540, filed on Jan. 27, 2014, now Pat. No. 9,143,741, which is a continuation-in-part of application No. 13/921,597, filed on Jun. 19, 2013, now Pat. No. 9,172,917.

(60) Provisional application No. 62/461,947, filed on Feb. 22, 2017, provisional application No. 62/367,747, filed on Jul. 28, 2016, provisional application No. 62/393,922, filed on Sep. 13, 2016, provisional application No. 62/335,827, filed on May 13, 2016, provisional application No. 62/328,827, filed on Apr. 28, 2016, provisional application No. 62/197,322, filed on Jul. 27, 2015, provisional application No. 62/166,968, filed on May 27, 2015, provisional application No. 61/902,943, filed on Nov. 12, 2013, provisional application No. 61/783,565, filed on Mar. 14, 2013, provisional application No. 61/790,865, filed on Mar. 15, 2013, provisional application No. 61/783,474, filed on Mar. 14, 2013, provisional application No. 61/684,310, filed on Aug. 17, 2012, provisional application No. 61/923,931, filed on Jan. 6, 2014.

(51) Int. Cl.
  *F21Y 101/00*          (2016.01)
  *F21W 131/107*         (2006.01)
(52) U.S. Cl.
  CPC .... *F21W 2131/107* (2013.01); *F21Y 2101/00* (2013.01)

(56) References Cited

U.S. PATENT DOCUMENTS

| | | | |
|---|---|---|---|
| 2012/0262575 A1* | 10/2012 | Champagne | G08B 13/19613 348/143 |
| 2018/0157915 A1* | 6/2018 | Sherry | G06K 9/00771 |
| 2018/0211098 A1* | 7/2018 | Tanaka | G06K 9/00268 |

* cited by examiner

FACE RECOGNITION SYSTEMS WITH EXTERNAL STIMULUS

This application relates to U.S. Ser. No. 15/899,007, filed Sep. 19, 2018, which relates to U.S. Provisional Application No. 62/461,947, filed Feb. 22, 2017. U.S. Ser. No. 15/899,007, filed Sep. 19, 2018 also relates to U.S. Ser. No. 15/659,873, filed Jul. 27, 2017, which relates to U.S. Provisional Application No. 62/367,747, filed Jul. 28, 2016. U.S. Ser. No. 15/899,007, filed Sep. 19, 2018 also relates to U.S. Ser. No. 15/157,632, filed May 18, 2016, now U.S. Pat. No. 9,832,833. U.S. Ser. No. 15/899,007, filed Sep. 19, 2018 also relates to U.S. Ser. No. 15/611,975, filed Jun. 2, 2017, now U.S. Pat. No. 10,117,309, which relates to U.S. Provisional Application No. 62/393,922, filed Sep. 13, 2016. U.S. Ser. No. 15/611,975, filed Jun. 2, 2017 also relates to U.S. Ser. No. 15/593,570, filed May 12, 2017, which also relates to U.S. Provisional Application No. 62/335,827, filed May 13, 2016. U.S. Ser. No. 15/611,975, filed Jun. 2, 2017 also relates to Ser. No. 15/246,818, filed Aug. 25, 2016, now U.S. Pat. No. 9,728,077. U.S. Ser. No. 15/611,975, filed Jun. 2, 2017 also relates to U.S. Ser. No. 15/498,866, filed Apr. 27, 2017, which relates to U.S. Provisional Application No. 62/328,827, filed Apr. 28, 2016. U.S. Ser. No. 15/611,975 also relates to U.S. Ser. No. 15/214,866, filed Jul. 20, 2016, now U.S. Pat. No. 9,992,389. U.S. Ser. No. 15/214,866 relates to U.S. Provisional Application No. 62/240,862, filed Oct. 13, 2015. U.S. Ser. No. 15/214,866, filed Jul. 20, 2016 relates to U.S. Provisional Application No. 62/197,322, filed Jul. 27, 2015. U.S. Ser. No. 15/611,975, filed Jun. 2, 2017 relates to U.S. Ser. No. 14/881,275, filed Oct. 13, 2015. U.S. Ser. No. 14/881,275, filed Oct. 13, 2015, relates to U.S. Ser. No. 14/859,867, filed Sep. 21, 2015, now U.S. Pat. No. 9,654,678, which relates to U.S. Provisional Application No. 62/166,968, filed May 27, 2015. U.S. Ser. No. 14/859,867, filed Sep. 21, 2015, relates to U.S. Ser. No. 14/664,275, filed Mar. 20, 2015, now U.S. Pat. No. 9,726,338. U.S. Ser. No. 14/859,867, filed Sep. 21, 2015 relates to U.S. Ser. No. 14/504,632, filed Oct. 2, 2014. U.S. Ser. No. 14/859,867, filed Sep. 21, 2015 relates to U.S. Ser. No. 14/519,642, filed Oct. 21, 2014, which relates to U.S. Provisional Application No. 61/902,943, filed Nov. 12, 2013. U.S. Ser. No. 14/859,867, filed Sep. 21, 2015 relates to U.S. Ser. No. 14/205,946, filed Mar. 12, 2014, now U.S. Pat. No. 9,542,832, which relates to U.S. Provisional Application No. 61/783,565, filed Mar. 14, 2013. U.S. Ser. No. 14/859,867, filed Sep. 21, 2015 relates to U.S. Ser. No. 14/164,540, filed Jan. 27, 2014, now U.S. Pat. No. 9,143,741. U.S. Ser. No. 14/164,540, filed Jan. 27, 2014 relates to U.S. Ser. No. 13/921,597, filed Jun. 19, 2013, now U.S. Pat. No. 9,172,917, which relates to (i) U.S. Provisional Application No. 61/790,865, filed Mar. 15, 2013, (ii) U.S. Provisional Application No. 61/783,474, filed Mar. 14, 2013, and (iii) U.S. Provisional Application No. 61/684,310, filed Aug. 17, 2012. U.S. Ser. No. 14/164,540, filed Jan. 27, 2014 relates to U.S. Provisional Application No. 61/923,931, filed Jan. 6, 2014. U.S. Ser. No. 15/899,007 relates to U.S. Ser. No. 15/366,196, filed Dec. 1, 2016, now U.S. Pat. No. 9,685,071. Each of the mentioned applications are hereby incorporated by reference in their entirety.

FIELD OF THE INVENTION

The invention relates to security cameras generally and, more particularly, to a method and/or apparatus for face recognition systems with external stimulus.

BACKGROUND

Security cameras detect motion and start recording a video or capture pictures of an object. Often times, if the moving object is a person, the face of the person is only partially captured. Face recognition technology will not be able to identify the person with only a partial capture. Face recognition is far from perfect and struggles to perform under some conditions. Face recognition can be successful when full frontal faces or when the face is turned 20 degrees. The closer the captured face is to a profile view, the more facial recognition is likely to be unsuccessful. Other conditions where face recognition does not work well include poor lighting, sunglasses, hats, scarves, beards, long hair, makeup or other objects partially covering the face, and low resolution images. Another serious disadvantage is that facial recognition is less effective if facial expressions vary.

The main disadvantage of the current face recognition systems is in not getting a frontal face image for recognition. Implementing multiple cameras at different angles at the same location to increase the chance of capturing good face images may not be possible or effective. Furthermore, providing video data that does not capture a full frontal face image reduces an ability to perform real-time facial recognition. Without knowing which frames are likely to have full frontal face images can waste processing resources and extend the time needed to perform facial recognition. To perform real-time analysis of face recognition, the number of images must be small enough for real-time analysis (i.e., approximately 10 ms) and contain good frontal face images.

It would be desirable to implement face recognition systems with external stimulus.

SUMMARY

The invention concerns an apparatus comprising a camera and a processor. The camera may be configured to capture video data of an area of interest. The processor may be configured to (A) process the video data, (B) generate control signals used to initiate an external stimulus and (C) execute computer readable instructions. The computer readable instructions may be executed by the processor to (a) stream the video data to an external server, receive facial recognition results from the external server and (c) if the facial recognition results cannot detect a face of a detected person, determine which of the control signals to generate. The external stimuli may be implemented to encourage a detected person to look in a direction of the camera sensor.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include face recognition systems with external stimulus that may (i) select frames to be used for video analysis, (ii) perform local facial recognition, (iii) upload selected video frames to a cloud service for real-time video analysis, (iv) intelligently select an appropriate stimulus, (v) generate feedback on facial recognition results to improve machine learning, (vi) encourage a detected person to look towards a camera sensor, (vii) increase a probability of capturing a frontal facial image during a pre-determined time frame, (viii) detect a person and/or (ix) be implemented as one or more integrated circuits.

Figure 1:
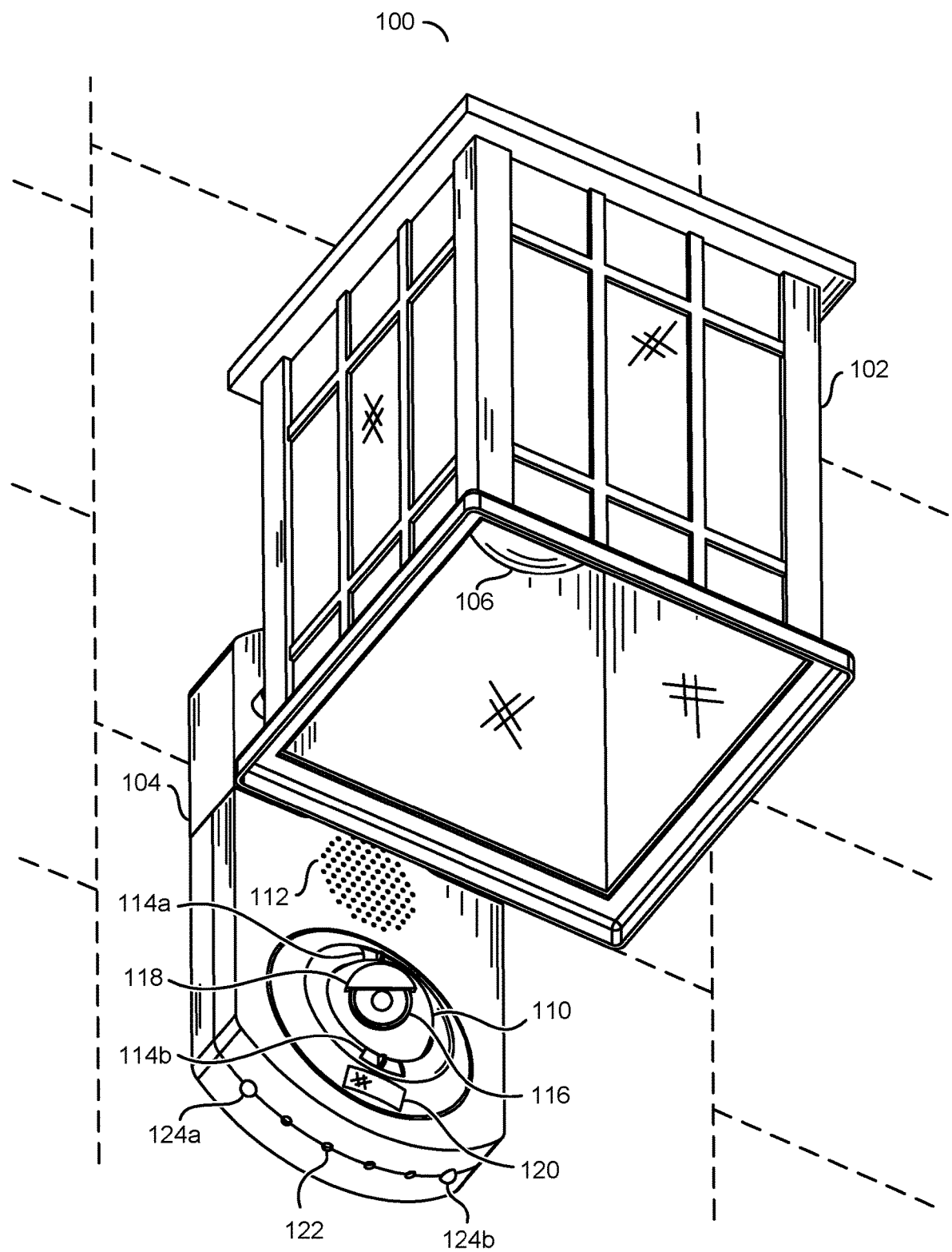
FIG. 1 is a diagram illustrating a security light implementing an embodiment of the present invention.

Referring to FIG. 1, a diagram illustrating a security light 100 implementing an embodiment of the present invention is shown. The security light 100 may be the smart security IP camera. The smart security light 100 may comprise a light shade 102 and the base 104. The base 104 may comprise a lens module 110, a speaker grille 112, adjustment grips 114a-114b, an IR sensor lens 120, a microphone grille 122, and indicator LEDs 124a-124b. The lens module 110 may comprise a lens 116 and a lens cover 118.

The smart security light 100 may further optionally comprise a light bulb 106. The light bulb 106 may be replaceable. The light bulb 106 may be implemented using an incandescent light bulb, a compact fluorescent lamp (CFL) bulb and/or an LED bulb. The type and/or style of the light bulb 106 may be varied according to the design criteria of a particular implementation.

The smart security light 100 may be implemented as a light fixture. The smart security light fixture 100 may be configured to mount to a wall and/or ceiling mount. The smart security light fixture 100 may be configured to connect to existing electrical wiring. For example, the smart security light fixture 100 may be mounted to an electrical box (e.g., a junction box) that provides wiring to the electrical system of a premises.

The lens module 110 may be configured to capture video data. In one example, the lens module 110 may implement a 720P HD video camera. In another example, the lens module 110 may implement a 1080P HD video camera. The video data may be high-resolution video frames and/or audio data. The quality of the video data may be varied according to the design criteria of a particular implementation. Generally, the quality of the video data is enough to support object detection (e.g., facial recognition, motion detection, object identification, tagging, etc.).

Figure 2:
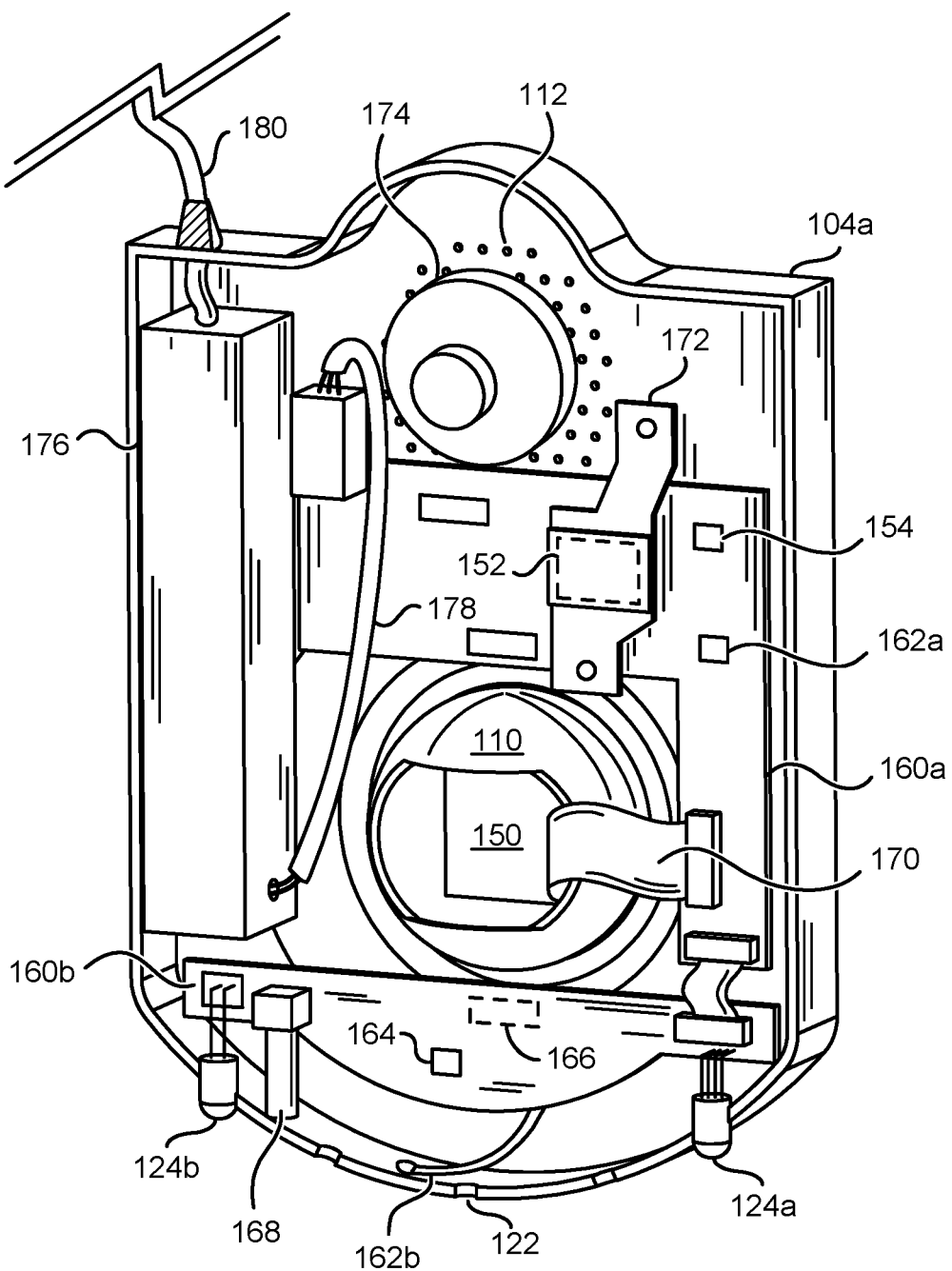
FIG. 2 is a diagram illustrating a rear view of the internal components of a security light implementing an embodiment of the present invention.

Referring to FIG. 2, a rear view of the internal components of the security light 100 implementing an embodiment of the present invention is shown. A backside of a front portion 104a of the base 104 is shown. A camera sensor 150 is shown in the lens module 110. A processor 152 is shown. Circuit boards 160a-160b are shown. In an example, the circuit board 160a may be a processor module. A memory 154 is shown on the circuit board 160a.

The circuit board 160a is shown as an L-shape (e.g., configured to fit around the lens module 110). The circuit board 160a is shown comprising the processor 152 and a communication module 162a. For example, the communication module 162a may be a Wi-Fi circuit. The communication module 162a may be connected to an antenna 162b. For example, the antenna 162b may be a flexible Wi-Fi antenna. The Wi-Fi antenna 162b may be held in place (e.g., glued) to a bottom of the base 104. The circuit board 160a may comprise other internal components of the light fixture 100. For example, the circuit board 160a may comprise a Bluetooth antenna (e.g., a Bluetooth antenna may be positioned on the other side of the circuit board 160a).

The circuit board 160b is shown connected to the circuit board 160a. The circuit board 160b is shown connected to a microphone 164, an IR sensor 166, the indicator LEDs 124a-124b and a reset button 168. The arrangement of the components and/or the type of components of the circuit board 160b may be varied according to the design criteria of a particular implementation.

The lens module 110 is shown having an opening. The opening may allow a cable 170 to connect the camera sensor 150 to the circuit board 160a. The cable 170 may be configured to transmit the video data captured by the camera sensor 150. For example, the cable 170 may be a high-speed, low-noise flexible cable. The circuit board 160a may transmit the video data from the cable 170 to the processor 152.

The processor 152 is shown under a heatsink 172. A speaker 174 is shown connected to the circuit board 160a. A power adapter 176 is shown connected to the processor module 160a. A cable 178 is shown connecting the power adapter 176 to the processor module 160a. The cable 178 may transmit supply power converted by the power adapter 176 to the processor module 160a (and the lens module 110). The cable 178 may transmit the control signals from the processor 152 to the power supply 176. For example, the cable 178 may transmit DC signals between the power supply 176 and the circuit boards 160a-160b. The power adapter 176 may convert the control signals from the processor 152 to be compatible with the light bulb 102 and/or other external devices such as security response devices. For example, the power adapter 176 may convert external power received from a cable 180 to provide power to the circuit boards 160a-160b via the cable 178. In another example, the power adapter 176 may convert signals received from the circuit boards 160a-160b via the cable 178 to provide power to external devices such as the security response devices via the cable 180.

The communication module 162 may be configured to connect to a local network and/or a wide area network (e.g., the internet). In some embodiments, the communication module 162 may be configured to implement one or more types of communications protocols. For example, the communication module 162 may support a Wi-Fi connection and/or a Bluetooth connection. In some embodiments, the communication module 162 may be distributed as multiple circuits on the circuit boards 160a-160b (e.g., a processing chip for each communications protocol). Other types of communications protocols may be implemented according to the design criteria of a particular implementation. In some embodiments, the communication module 162 may implement the Bluetooth connection to connect to a user device (e.g., a smartphone) to provide an interface for configuring the light fixture 100 (e.g., to allow the user to input local network settings). In some embodiments, the communication module 162 may implement the Wi-Fi connection to connect to a cloud service via the internet.

In some embodiments, the smart light fixture 100 may be configured to upload data (e.g., the captured video data) to the cloud service. For example, the data uploaded to the cloud service may be streamed to the user device. The user device may connect to the cloud service to allow the user to request the stored video data. For example, the video data may be sent to the user device as a live (or nearly live) video stream. The data traffic to/from the cloud services may be encrypted (e.g., AES 128-bit encryption, AES 256-bit encryption, etc.). User account passwords may be salted and hashed with a cryptographic hash function.

In some embodiments, the smart security light fixture 100 may store the captured video data (e.g., in the memory 154). In some embodiments, the video data may be uploaded to the cloud service. Generally, the cloud service and/or the memory 154 may have a limited storage capacity. In some embodiments, the light fixture 100 may analyze the captured video data (e.g., using the processor 152) and/or data from the IR sensor 166 to perform a particular type of detection. For example, the light fixture 100 may detect objects, motion and/or visitors within in an area of interest. The smart security light fixture 100 may initiate storage of the video data in response to the particular type of detection. The detection performed by the smart security light fixture 100 may be used to detect objects approaching the premises.

Figure 3:
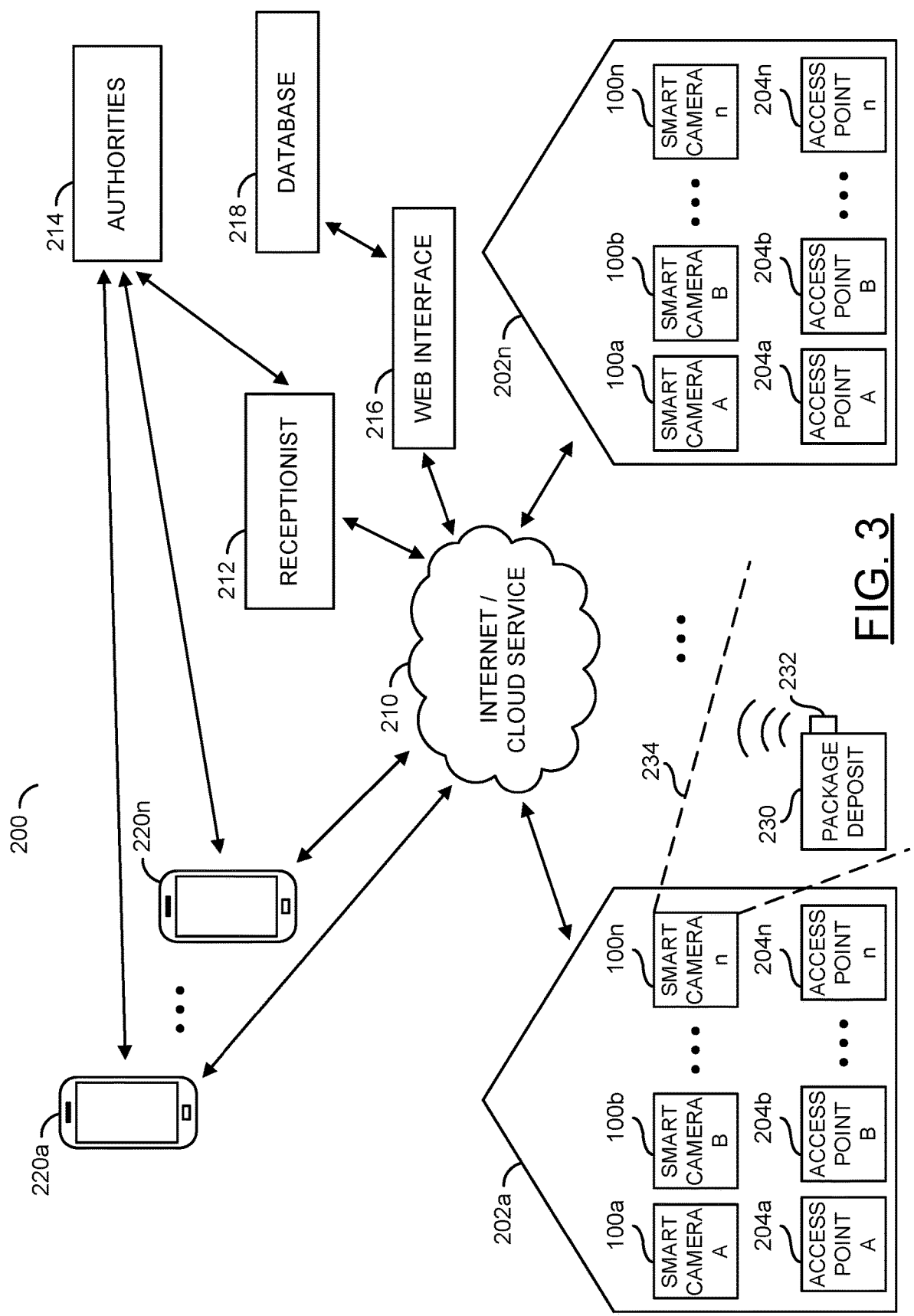
FIG. 3 is a diagram illustrating an example cloud-based security system.

Referring to FIG. 3, a diagram illustrating an example cloud-based security system 200 is shown. The system 200 generally comprises blocks 202a-202n. The blocks 202a-202n may be homes and/or business premises. Each of the homes 202a-202n may comprise blocks 204a-204n. The blocks 204a-204n may be areas of interest (e.g., access points to the homes and/or business premises 202a-202n). The smart security lights 100a-100n may be set up at each of the areas of interest 204a-204n of the homes and/or business premises 202a-202n. For example, the smart security lights 100a-100n may be configured to monitor the areas of interest 204a-204n.

The system 200 may further comprise the internet and/or cloud service 210, a receptionist 212, authorities 214, a web interface 216, a database 218 and/or blocks (or circuits) 220a-220n. The circuits 220a-220n may be the user devices. In an example, the user devices 220a-220n may be smartphones and/or other personal computing devices. In one example, the receptionist 212 may be a virtual receptionist. In another example, the receptionist 212 may be a person from a central monitoring service. In one example, the authorities 214 may be the police department, the fire department, an ambulance, and/or other emergency services.

The areas of interest 204a-204n may be doors, windows, garages, other entrances, and/or vantage points. Generally, the smart cameras 100a-100n may be mounted at the areas of interest 204a-204n. Data from the smart cameras 100a-100n at the homes and/or business premises 202a-202n may be sent to the internet and/or cloud service 210.

Data sent to the internet and/or cloud service 210 may be sent to the user devices 220a-220n. For example, an alert from one of the smart cameras 100a-100n from the home 202a may be sent to the device 220a of the homeowner indicating that another family member has arrived home. In another example, an alert from one of the smart cameras 100a-100n from the home 202n may be sent to the smartphone 220c of an owner of another home (e.g., the owner of the home 202b) that a suspicious person has been identified in the neighborhood. A user may then send a notification to the authorities 214. A user of the user devices 220a-220n may send data back to the smart cameras 100a-100n of the homes and/or business premises 202a-202n through the Internet and/or cloud service 210. In one example, a homeowner may send a command to arm an alarm (e.g., one of the security responses) at their home.

In one example, the user devices 220a-220n may be in the possession of trusted volunteers. The trusted volunteers may be other home owners in the system 200. The trusted volunteers may be the first line of response to a security issue detected by the system 200. Alerts by the system 200 may be sent in parallel to all the trusted volunteers. The trusted volunteers may use available communication channels provided such as cell phones, telephone and/or emails. The homeowner may advise particular pre-defined responses to particular alerts such as calling the authorities 214 (e.g., the police and/or the fire department). The trusted volunteers may be able to activate a set of pre-defined actions using the user devices 220a-220n. The trusted volunteers may take training sessions to learn how to properly respond to various alerts. The training sessions may be taken on-line. The on-line training sessions may be available on the web interface 216.

If the network of trusted neighbors 202a-202n has the same system, they may exchange images, video, and/or other information of unwelcomed visitors. The website and/or web interface 216 may have the database 218 to manage the images, video, and/or other information. Unwelcome visitors stored in the database 218 may be shared with other neighbors and/or the authorities 214 using the web interface 216. For example, when the unwelcomed visitors learn about the database 218 they may not target the neighborhood 202a-202n. Data in the database 218 may be used to classify types of visitors (e.g., comparisons may be performed between the captured video data and information in the database 218).

Multiple levels of alerts may be implemented to distinguish unwelcomed visitors from welcomed visitors (e.g., household members). Since most visitors may be welcomed, identifying strangers and raising the level of alert for immediate attention may be important. The technology to identify and/or classify welcomed visitors may include facial recognition, voice recognition, machine learning of habits and schedules of household members, and/or user inputs when errors occur. Learned behavior may be used to determine which pre-defined function to perform. For example, the learned behavior may determine that nobody is home at a particular time, and the pre-defined function may be to automatically arm the security system and/or perform energy saving functions (e.g., adjust the heating and/or cooling of a home). In another example, the daily schedule of inhabitants may be observed and/or recorded. The daily schedule of inhabitants may be learned using various sensors. For example, patterns may be observed such as daily energy use requirements at a certain time of day and/or the arming/disarming of a security system. In another example, smart lighting may estimate the amount of lighting needed at a particular time of day based on the occupants in a home. If nobody is home, the system 200 may determine that exterior lighting is needed and/or interior lighting is not needed. In another example, if a family is on vacation the system may turn on interior lighting to make it appear to a potential burglar that the home is occupied. The learned behavior may develop a unified status of the home (e.g., based on occupancy, time of day, weather, security status, etc.). Pre-defined functions may be performed based on the unified status of the home.

In some embodiments, the smart security light fixture 100 may initiate storage of the video data in response to motion detection in the area of interest. The user device 220a (e.g., a smart phone) may be used to allow a user to set a motion threshold for the smart security light fixture 100. For example, a lower motion threshold may be more sensitive to motion. In another example, a higher motion threshold may be less sensitive to motion (e.g., reduce a number of false positives). The motion threshold may be adjustable.

In some embodiments, the smart security light fixture 100 may initiate storage of the video data in response to detecting and/or locating a person (e.g., a visitor) and/or other type of object in the video data. In one example, the smart security light fixture 100 may analyze the video data to detect people and/or animals. In some embodiments, facial recognition may be implemented to classify and/or recognize visitors. The activation state may be selected based on the classification. In some embodiments, the video data may be analyzed to determine a behavior of the visitors.

In some embodiments, machine learning techniques may be implemented to improve detection and/or classification accuracy of visitors and/or objects. For example, the user may be able to provide a correct and/or incorrect label to a detection performed by the smart security light fixture 100. If the detection and/or classification is incorrect, the incorrect label may be used by the smart security light fixture 100 to incorporate an incorrect result of the detection into the machine learning techniques. In some embodiments, the machine learning techniques may be implemented in the cloud service (e.g., the analysis is performed using cloud computing resources). Video data and/or correct/incorrect labels may be uploaded and/or stored anonymously (e.g., without personal identification information). The smart security light fixture 100 may be configured to ignore (e.g., not respond to, not track and/or not send notifications in response to) small animals and/or shadows.

In some embodiments, the smart security light fixture 100 may be configured to send notifications to the user devices 220a-220n in response to the detection. For example, a text message and/or an email may be transmitted in response to the notification. In another example, a notification may be sent via an API (e.g., push notifications) for a particular operating system (e.g., Android notifications, IOS notifications, Windows notifications, etc.). Generally, the user may create a user account (e.g., comprising at least an email address and a password as credentials) for the cloud service (e.g., via an app and/or the web-based interface 216). The user account may allow the user to configure preferences. The preferences may comprise the notification settings. The type of notifications sent by the smart security light fixture 100 may be based on the notification settings. The smart security light 100 may implement the activation states and/or arm/disarm the security responses to limit a number of the notifications sent. Intelligently limiting the number of notifications sent may reduce a number of false alarms and/or reduce an amount of data transferred via the network 210 (e.g., prevent QoS issues and/or dropped data).

The cloud service 210 and/or the database 218 may store portions of the video data. For example, portions of the video data may be saved in response to the particular types of detections. The portions of video data may be video clips. The video clips may be encoded and/or compressed by the processor 152 to reduce a size of storage capacity of the video clips. The video clips may have a limited video length (e.g., 30 seconds, one minute, 90 seconds, five minutes, etc.). The length of the video clips may be based on the configuration preferences and/or in response to the detections by the light fixture 100 (e.g., a longer video clip may result in response to continuous detections). In some embodiments, the video clips may be pre-padded and/or post-padded with video data before and/or after the detection. For example, the video clip may store video data from a pre-determined time before and/or after the detection (e.g., 30 seconds before the detection and/or 30 seconds after the detection for a video clip approximately one minute long).

In some embodiments, a user interface may be provided for the user devices 220a-220n (e.g., an app, an executable program, the web-based interface 216, etc.). The user interface may allow one or more of the user devices 220a-220n to control various components of the light fixture 100. For example, one or more user devices 220a-220n may be configured to access the user account. The control signals may be generated in response to the input from the user devices 220a-220n. For example, an icon may be provided on the user interface representing a light bulb. The user may activate and/or deactivate the light bulb 102 by pressing (touching on a touchscreen, clicking, etc.) the icon.

Other components such as security response components may be turned on and/or off from the user interface. For example, icons may be provided to allow the user to control the speaker 174. In one example, the speaker 174 may playback a pre-recorded audio message (e.g., the user may select from one or more pre-recorded audio messages on the user interface). In another example, the speaker 174 may sound an alarm (e.g., one or more alarm types may be selected from the user interface).

In some embodiments, the light fixture 100 may be configured for two-way audio communications (e.g., an intercom). For example, a visitor may speak through the microphone 164. The microphone 164 may receive the audio data. The communication module 162 may transmit the received audio to one or more of the user devices 220a-220n. The user devices 220a-220n may playback the audio to the user. The user may speak via the user devices 220a-220n. The user devices 220a-220n may transmit the audio to the light fixture 100 via the communication module 162 (e.g., a Wi-Fi connection). The speaker 174 may transmit and/or stream the received audio.

The light fixture 100 may provide various APIs (application programming interface) to connect with other devices (e.g., other home automation devices). For example, the APIs may allow various other devices to communicate with the light fixture 100. The light fixture 100 may generate control signals based on the communication with the various devices other devices. The types of APIs available may be varied according to the design criteria of a particular implementation.

A package deposit 230 is shown at the home 202a. The package deposit 230 may be implemented to allow the visitor to deliver packages. The package deposit 230 may be implemented as a container, a bag, a delivery slot, a mailbox, etc. In an example, the package deposit 230 may be implemented as a large net with a zipper and a lock. A delivery person may be instructed by the smart security light 100 to place a package inside the package deposit 230 and zip up and/or lock the package deposit 230. In some embodiments, the package deposit 230 may implement a hazardous waste storage (e.g., medical waste for a medical facility) and the package deposit 230 may be monitored to ensure proper disposal of materials in the package deposit 230 (e.g., the package deposit 230 may be implemented for package pick-up). The implementation of the package deposit 230 may be varied according to the design criteria of a particular implementation.

A wireless device 232 is shown on the package deposit 230. The wireless device 232 may be configured to transmit wireless signals to indicate a status of the package deposit 230. In an example, the wireless device 232 may send a notification to the security light 100 indicating that the package has been delivered. In another example, the wireless device 232 may be configured to send a notification to the security light 100 indicating that the package deposit 230 has been tampered with. The smart security light 100 may forward the notification to one or more of the user devices 220a-220n. The type of notifications transmitted by the wireless device 232 may be varied according to the design criteria of a particular implementation.

The smart security light 100 may be configured to adjust the activation state in response to the package being delivered and/or picked up (e.g., in response to the notification from the wireless device 232). A security zone 234 is shown. The smart security camera 100n may monitor the security zone 234 near the package deposit 230. In an example, when the security zone 234 is invaded (e.g., by a visitor such as a potential package thief) the smart security light 100 may be configured to perform a security response (e.g., activate an alarm, send an alert to a designated user, etc.). The security zone 234 may be the area of interest of the smart security light 100n. In some embodiments, the security zone 234 may correspond to the areas of interest 204a-204n.

Figure 4:
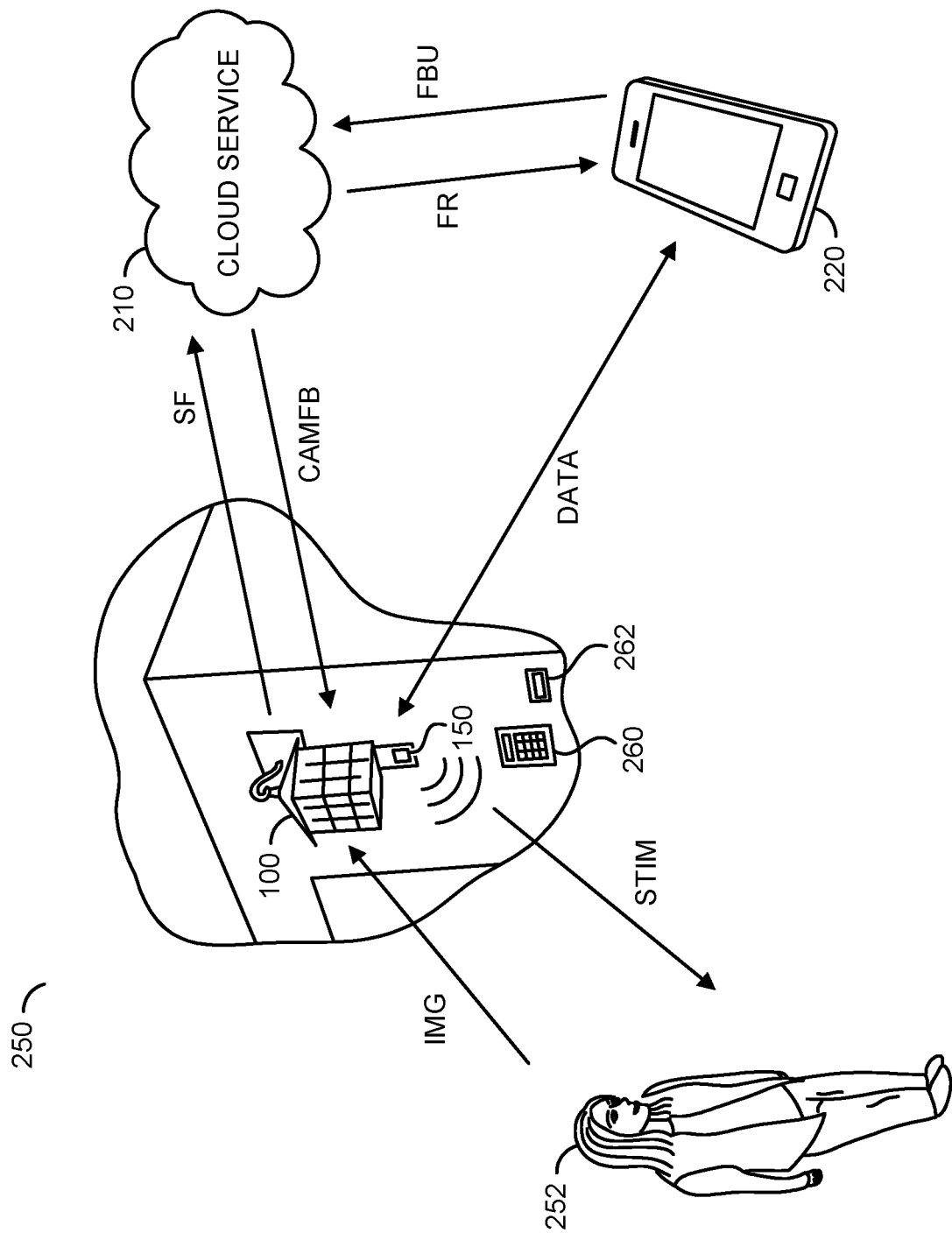
FIG. 4 is a diagram illustrating a security light implementing an external stimulus.

Referring to FIG. 4, a diagram illustrating a system 250 comprising a security light 100 implementing an external stimulus is shown. The system 250 may comprise the smart security light 100, the cloud service 210, the user device 220, a detected person 252, an input device 260 and/or an input device 262. The system 250 may be configured to solve two known problems of face recognition systems. One problem may be capturing face images that provide enough detail to be recognized (e.g., a frontal face image). Another problem may be knowing when the face images are likely to occur so that real-time analysis may be performed by the camera 100 and/or the cloud service 210.

Generally, face recognition systems rely on voluntary and/or passive behavior of the person 252 to look at the camera sensor 150. In typical environments, such as entrances to homes and/or office buildings, visitors often do not voluntarily look at the camera sensor 150, and/or are unaware of the smart camera 100. The smart camera 100 may implement artificial intelligence technology to generate intelligent and/or automatic stimulus. The stimulus may be implemented to cause (or encourage) the person 252 to look at the camera sensor 150 at pre-determined times. By knowing the pre-determined time that the person 252 may be likely to look at the camera sensor 150, a small number of selected images captured at the pre-determined times may be quickly analyzed by the face recognition systems for real-time applications.

The smart camera 100 may be configured to capture an image of an area of interest (e.g., the surrounding environment). The person 252 may be in the area of interest. The smart camera 100 may receive an input signal (e.g., IMG). For example, the signal IMG may be light and/or audio input that may be converted to video data by the components of the smart camera 100. The smart camera 100 may capture the person 252 in the area of interest. The smart camera 100 may be configured to generate a signal (e.g., STIM). The signal STIM may be an external stimulus. The external stimulus STIM may be implemented to encourage the person 252 to look towards the camera sensor 150 of the smart camera 100.

The smart camera 100 may be configured to perform local analysis on data captured. In some embodiments, the analysis may determine whether motion has been detected. In some embodiments, the analysis may be video analysis (e.g., detecting and/or recognizing objects in the captured video frames). For example, the smart camera 100 may determine whether a person is detected (e.g., perform person detection). In some embodiments, the smart camera 100 may be configured to perform intensive real-time facial recognition. The analysis performed by the processor 152 of the smart camera 100 may be varied according to the design criteria of a particular implementation.

The smart camera 100 may be configured to select some of the captured video frames for intensive real-time analysis. In some embodiments, the processor 152 may be capable of performing intensive real-time video analysis. In some embodiments, the smart camera 100 may transmit the selected video frames to the cloud service 210 for the intensive real-time video analysis. The smart camera 100 may be configured to transmit a signal (e.g., SF). The signal SF may comprise the selected video frames. The smart camera 100 may be configured to receive a signal (e.g., CAMFB) from the cloud service 210. The signal CAMFB may comprise feedback from the facial recognition performed by the cloud service 210. The feedback in the signal CAMFB may provide information about whether a facial detection was able to be performed and/or whether there has been a facial recognition match. In some embodiments, the signal SF and/or the signal CAMFB may be generated locally (e.g., the facial recognition on the selected video frames may be performed by the components of the smart camera 100).

The user device 220 may be configured to receive a signal (e.g., FR) generated by the cloud service 210 (or the smart camera 100). The signal FR may comprise facial recognition information. For example, the cloud service 210 may identify a face (e.g., identify a face as belonging to person X), and the signal FR may provide the information to the user device 220. The homeowner may confirm whether the cloud service 210 (or the smart camera 100) has correctly identified the detected face. The user device 220 may generate a signal (e.g., FBU) for the cloud service 210 (or the smart camera 100). The signal FBU may comprise the feedback from the homeowner about the correctness of the facial recognition. The cloud service 210 (or the smart camera 100) may use the feedback from the signal FBU to improve the machine learning and/or artificial intelligence used for facial recognition. The smart camera 100 and the user device 220 may transmit/receive a signal (e.g., DATA). The signal DATA may comprise miscellaneous data exchanged between the smart camera 100 and the user device 220 (e.g., provide a live camera feed, enable the homeowner to speak in real-time with the person 252, enable the homeowner to control the light bulb 106, etc.).

The smart camera 100 may be configured to combine an analysis of behavior of the person 252 (e.g., duration of loitering, direction to/from the entrance of the premises 202, attempts to enter the premises 202, etc.), the external stimulus STIM and/or the face recognition systems. The facial recognition may rely on having good face images. The smart camera 100 may implement AI technology in order to generate an appropriate one of the external stimuli to encourage the visitor 252 to look at the camera sensor 150 at pre-determined times. Since face recognition technology may be ineffective when the face in the captured image is only partial, and may be most accurate when the face is frontal and directed to the camera 150, the smart camera 100 may be configured to solve the problem of face recognition when the person 252 detected by the smart camera 100 camera is not looking at the camera. The smart camera 100 may solve the problem by generating the external stimulus STIM.

In an example, a visitor (e.g., the person 252) to the building 202 (e.g., residential and/or commercial) may not look at the smart camera 100. In another example, the visitor 252 may try to avoid looking at the smart camera 100. The smart camera 100 may use the external stimulus STIM (e.g., a voice, sound, light, etc.) to cause and/or encourage the visitor 252 to look at the camera sensor 150 directly at a pre-determined time.

The input device 260 may implement a keypad and/or touchscreen. The input device 260 may enable the visitor 252 to provide input to the smart camera 100. In an example, the keypad 260 may be one of the external devices for the smart camera 100. In some embodiments, the keypad 260 may be non-functional (e.g., a dummy device). The keypad 260 may be implemented to encourage the visitor 252 to walk towards the smart camera 100 so that the camera sensor 150 may capture a frontal view of the face. For example, the smart camera 100 may generate the signal STIM to instruct the visitor 252 to provide an input to the keypad 260. Regardless of what the visitor 252 inputs on the keypad 260, the camera sensor 150 may capture a frontal view of the face of the visitor 252. In the example shown, the keypad 260 is located under the camera sensor 150 such that when the visitor interacts with the keypad 260, the face of the visitor 252 would be in position to be captured using the camera sensor 150.

The input device 262 may implement a fingerprint scanner and/or a retinal scanner. The input device 262 may enable the visitor 252 to provide input to the smart camera 100. In an example, the scanner 262 may be one of the external devices for the smart camera 100. In some embodiments, the scanner 262 may be non-functional (e.g., a dummy device). The scanner 262 may be implemented to encourage the visitor 252 to walk towards the smart camera 100 so that the camera sensor 150 may capture a frontal view of the face. For example, the smart camera 100 may generate the signal STIM to instruct the visitor 252 to provide a fingerprint on the fingerprint scanner 262. Regardless of the fingerprint input (or retinal scan input), the camera sensor 150 may capture a frontal view of the face of the visitor 252. In another example, the retinal scanner 262 may be the lens module 110 (e.g., the instruction may be to have the visitor 252 approach the camera sensor 150 for a retinal scan). In the example shown, the scanner 262 is located under the camera sensor 150 such that when the visitor interacts with the scanner 262, the face of the visitor 252 would be in position to be captured using the camera sensor 150.

Figure 5:
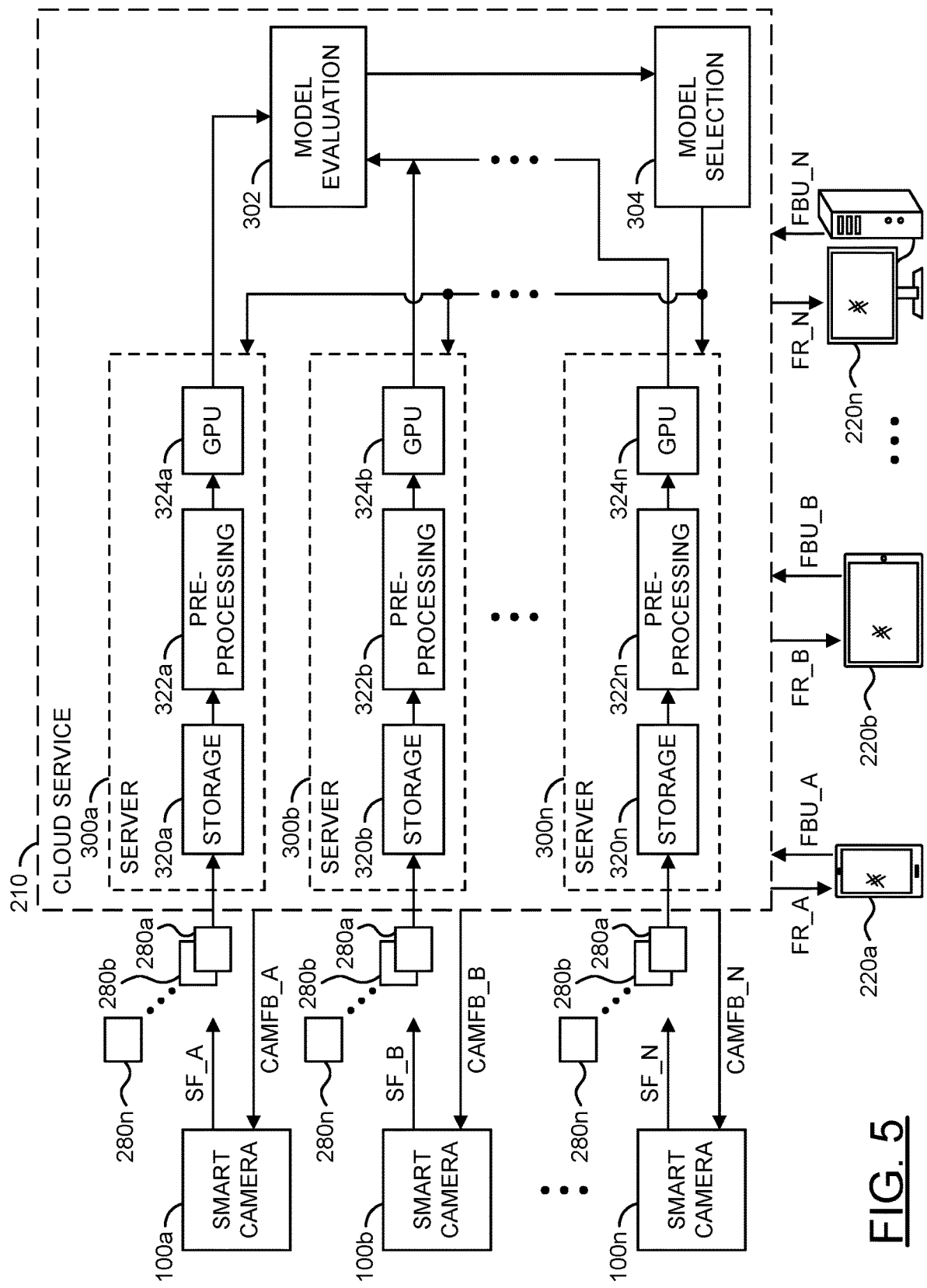
FIG. 5 is a diagram illustrating an example cloud vision pipeline.

Referring to FIG. 5, a diagram illustrating an example cloud vision pipeline is shown. The cloud vision pipeline may comprise one or more of the smart cameras 100a-100n, the cloud service 210, one or more of the user devices 220a-220n and/or selected video frames 280a-280b. In an example, the selected video frames 280a-280n may be transmitted as the data in transmitted signals (e.g., SF_A-SF_N). The selected video frames 280a-280n may comprise video frames that have been time stamped (e.g., include metadata that indicates a time of capture). The cloud server 210 may comprise server computers 300a-300n, a model evaluation module 302 and/or a model selection module 304. Each of the servers 300a-300n may comprise a respective one of storage modules 320a-320n, pre-processing modules 322a-322n and/or graphics processing units (GPUs) 324a-324n. The cloud server 210 may comprise other components and/or modules (not shown). The number and/or types of components/modules implemented by the cloud server 210 may be varied according to the design criteria of a particular implementation.

The cloud server 210 and/or the servers 300a-300n may be implemented as part of a cloud computing platform (e.g., distributed computing). In an example, the servers 300a-300n may be implemented as a group of cloud-based, scalable servers. By implementing a number of scalable servers, the cloud service 210 may have additional resources (e.g., power, processing capability, memory, etc.) available to process and/or store variable amounts of data. For example, the cloud service 210 may be configured to scale (e.g., provision resources) based on demand. The cloud service 210 may implement scalable computing (e.g., cloud computing). The scalable computing may be available as a service to allow access to processing and/or storage resources without having to build infrastructure (e.g., the provider of the smart cameras 100a-100n may not have to build the infrastructure of the cloud service 210).

The cloud service 210 may implement a horizontally scalable architecture for delivering advanced computer-vision driven features. The components of the cloud service 210 may be designed to be extensible and/or operate in real-time. In some embodiments, the smart cameras 100a-100n may be configured to perform on-camera vision (e.g., local video analysis of the selected frames 280a-280n). In some embodiments, the selected video frames 280a-280n may be transmitted to the cloud service 210. The servers 300a-300n, the model evaluation module 302 and/or the model selection module 304 may implement neural network object classification, segmentation and/or other advanced features (e.g., intensive, real-time video analysis).

The model evaluation module 302, the model selection module 304 and/or the components of the servers 300a-300n may be configured to implement a convolutional neural network for performing image recognition. For example, the selected video frames 280a-280n may be received and/or analyzed. The components of the cloud service 210 may apply various filters to pixels of each of the selected video frames 280a-280n. Generally, the filters apply matrix mathematical functions to generate feature maps. The pixels that have been evaluated may be used to generate multiple feature maps. For example, a filter may be applied to generate a feature map used to detect edges. In another example, a filter may be applied to generate a feature map used to detect pixel colors. Generating the feature maps may enable orientation invariant objects and/or features of the selected video frames 280a-280n to be detected. For example, various shapes, and/or patterns may be detected. By using training data, the components of the cloud server 210 may apply weighted values to associate multiple layers of the feature maps. The weighted values may enable particular pixel patterns to be mapped to a particular features of objects. When the selected video frames 280a-280n are analyzed using the convolutional neural network, the weighted values may associate the input pixels to particular features. The features may be used to recognize objects.

The storage modules 320a-320n may offer 10x scalability and/or performance by introducing an advanced pipeline and/or model selection. The pre-processing modules 322a-322n may receive the input images (e.g., the selected video frames 280a-280n) and perform pre-processing and/or the model selection module 304 may implement fast feature models at a low (computational) cost. The GPUs 324a-324n may implement deep learning models at a relatively higher (computational) cost. The GPUs 324a-324n may be customized components configured to efficiently implement the deep learning models. The model evaluation module 302 may implement pipeline updating.

The cloud service 210 may perform real-time (or near real-time) processing. The cloud service 210 may be dynamically scalable. For example, the cloud service may be designed for real-time performance and/or quick notifications while being able to scale dynamically with load.

The smart cameras 100a-100n and/or the cloud service 210 may be configured to split the computation and/or processing. In some embodiments, most of the intelligence and/or logic for facial recognition may be performed on the scalable servers 300a-300n. In some embodiments, the intelligence and/or logic for facial recognition may be performed by the smart cameras 100a-100n. For example, a split of the amount of processing performed by either the smart cameras 100a-100n and/or the cloud server 210 may be subject to change as processing capabilities of the smart cameras 100a-100n improve. As processing capabilities of the smart cameras 100a-100n improve, portions of the processing performed by the cloud server 210 may shift to the smart cameras 100a-100n. Shifting more processing to the smart cameras 100a-100n may improve a latency for facial recognition (e.g., a delay involved in transmitting data wirelessly may be reduced and the facial recognition may be implemented closer to real-time). Generally, there may be shared video processing responsibility between the cloud server 210 and the smart camera 100a-100n. The specifics of which component is doing a particular amount (or type) of processing may be varied according to the design criteria of a particular implementation.

Figure 6:
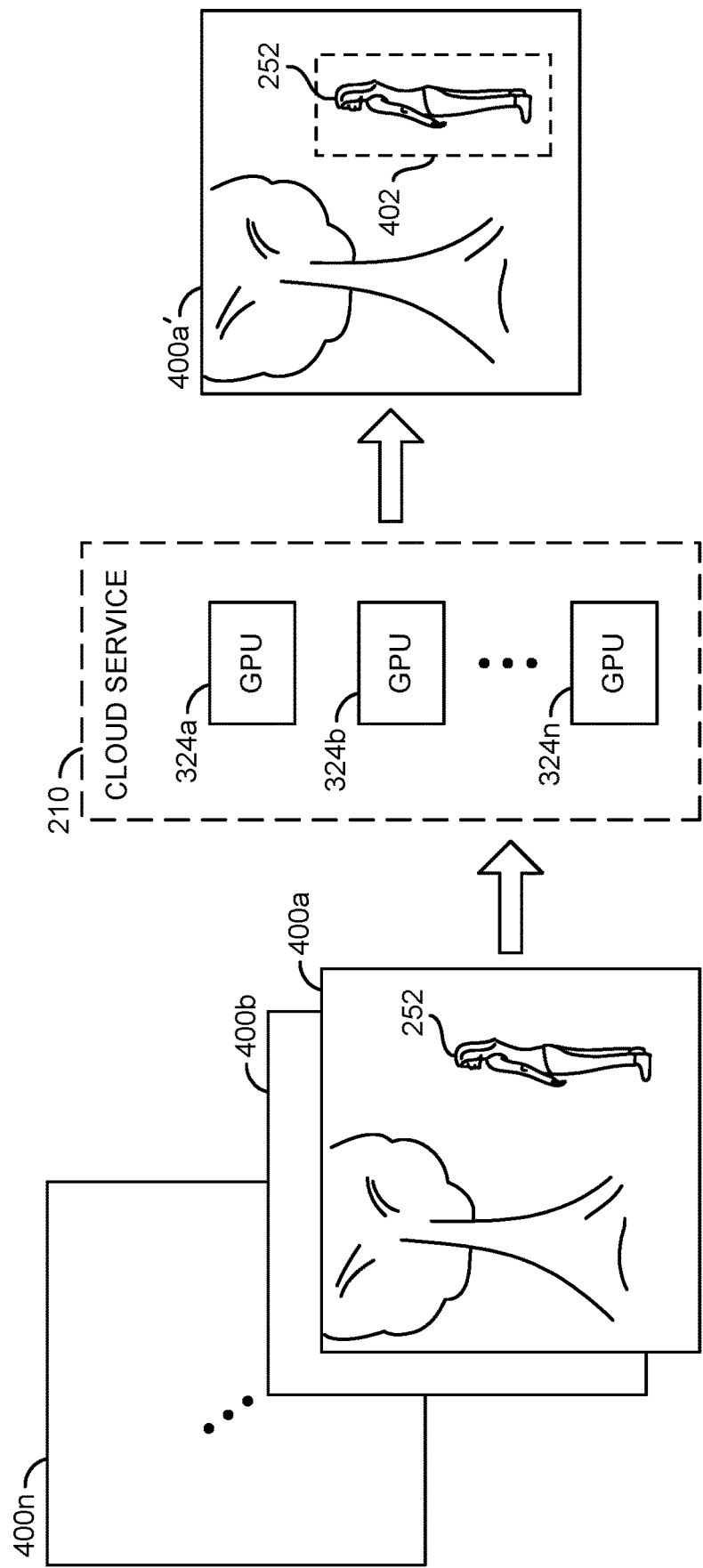
FIG. 6 is a diagram illustrating person detection.

Referring to FIG. 6, a diagram illustrating person detection is shown. The smart camera may capture video frames 400a-400n. The person 252 may be in one or more of the captured video frames 400a-400n. The smart camera 100 and/or the cloud service 210 may be implemented to determine that the person 252 is detected. Generally, the smart camera 100 and/or the cloud service 210 may split processing tasks (e.g., motion detection, object detection, facial recognition, etc.). For example, as the processing capability of the processor 152 is increased, the processor 152 may be used to perform more local processing and pass on less of the processing tasks to the cloud server 210.

In some embodiments, the processor 152 may be configured to perform motion detection to determine whether a visitor (or object of interest) is in one or more of the video frames 400a-400n. In some embodiments, the processor 152 may be configured to detect the person 252 in the video frames 400a-400n in real-time (or near real-time). The processor 152 may be configured to determine which of the captured video frames 400a-400n may be used for more advanced processing tasks.

The processor 152 may select the selected frames 280a-280n from the captured video frames 400a-400n. The selected video frames 280a-280n may be a subset of the captured video frames 400a-400n that have been determined to have a greater likelihood of success for the video processing task. In one example, the selected video frames 280a-280n may be determined based on motion detected by the components of the smart camera 100 (e.g., video frames that have motion may be more likely to have the visitor 252 detected by the IR sensor 166). In another example, the selected video frames 280a-280n may be a sequence of the captured video frames 400a-400n captured within a predetermined time frame after one of the external stimuli have been presented to the person 252 (e.g., a full frontal view of a face may be captured in the video frames 400a-400n shortly after the external stimulus STIM is presented). The criteria for selecting the selected video frames 280a-280n from the captured video frames 400a-400n may be varied based on the design criteria of a particular implementation and/or the processing task to be performed.

Using only the selected video frames 280a-280n for the processing tasks may decrease an amount of processing resources needed to perform advanced video analysis. For example, analyzing fewer video frames may result in a faster result. In another example, sending fewer video frames to the cloud server 210 may reduce bandwidth consumption and/or latency. In some embodiments, the selected video frames 280a-280n may be processed by the processor 152 (e.g., implement local real-time facial recognition and/or object detection). In some embodiments, the selected video frames 280a-280n may be transmitted by the smart camera 100 to the cloud server 210 and processed by the cloud server 210. The results of the processing by the cloud server 210 may be sent back to the smart camera 100 and/or one or more of the user devices 220a-220n. The video frame 400a' is shown with an object 402 detected. The detected object 402 may be the person 252.

Advances in computer vision technology may enable more powerful features and/or capabilities for the smart camera 100 and/or the cloud service 210. The video processing tasks may comprise recognizing people, recognizing vehicles and/or recognizing deliveries. The video processing tasks may enable tagging (e.g., adding metadata) and/or sharing detection suspicious individuals within the neighborhood 202a-202n. Performing the video processing tasks may enable professionally monitored outdoor security.

The cloud service 210 may be configured to implement deep learning neural nets for person detection. Convolutional neural networks may run on instances of the GPUs 324a-324n to recognize objects such as vehicles and/or people. Convolutional neural networks may form the foundation for more advanced capabilities for the video processing tasks. For example, input images (e.g., the selected video frames 280a-280n) may be provided to the cloud service 210, and the convolutional neural network may be implemented on the instances of the GPUs 324a-324n. The cloud service 210 may present classification and segmentation information (e.g., the video frame 400a' having metadata including the detected object 402).

The cloud service 210 may be configured to perform the video processing tasks quickly (e.g., 100 ms processing time) and/or accurately (e.g., 95% user satisfaction). The scalable implementation (e.g., predictive, dynamic scaling) of the cloud service 210 may enable a robust service providing independent instances for processing tasks.

In some embodiments, person detection may be implemented as a filter for determining the selected video frames 280a-280n. For example, the smart camera 100 may first determine whether motion has been detected. If motion has been detected, then the likelihood that the person 252 may be in the captured video frames 400a-400n may increase. Then the video processor 152 may perform video analysis to detect a person. If the person is detected, then the video frames 400a-400n may have a facial image usable for face recognition. The video frames 400a-400n that have a person detected, may be streamed to the cloud server 210 as the selected video frames 280a-280n. For example, the video frames 400a-400n without a person may be discarded, stored and/or used to determine false positives.

Figure 7:
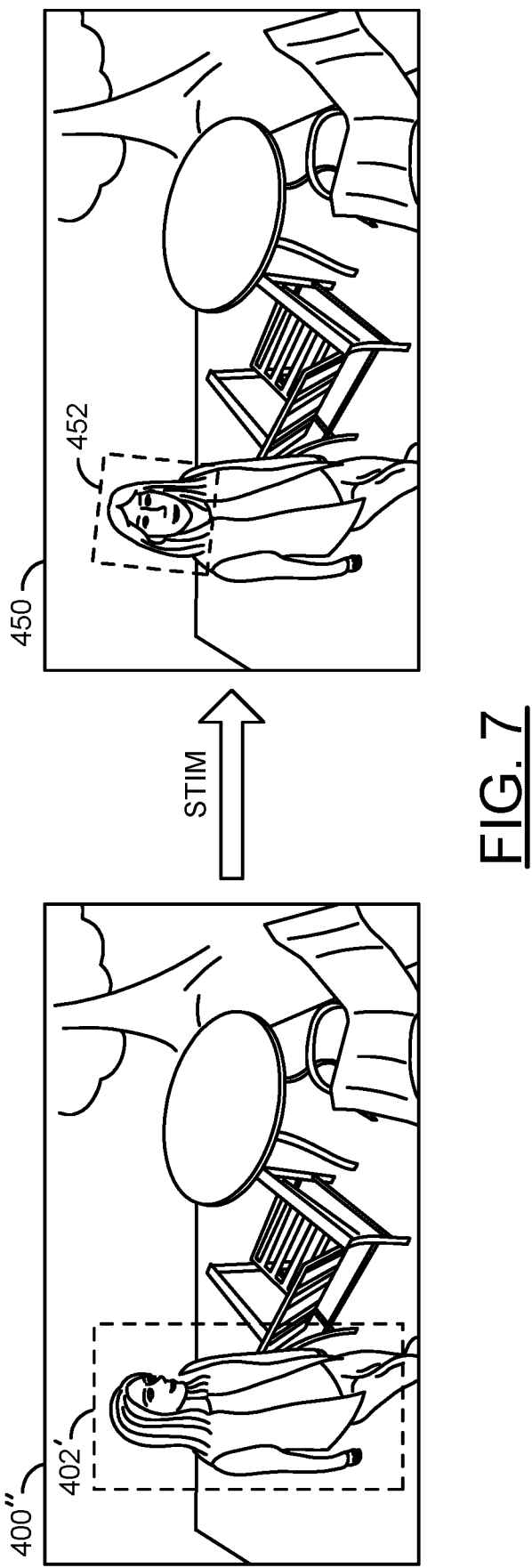
FIG. 7 is a diagram illustrating a response by a visitor encouraged by an external stimulus.

Referring to FIG. 7, a diagram illustrating a response by the visitor 252 encouraged by an external stimulus is shown.

The video frame 400" is shown. The video frame 400" may comprise the detected object 402'. The detected object 402' may be the visitor 252. In the video frame 400" the visitor 252 may be looking away from the camera sensor 150 (e.g., no frontal face image is available). In an example, the facial recognition video processing task may not be performed accurately based on the detected object 402' in the video frame 400".

The cloud server 210 and/or the processor 152 may intelligently select which of the external stimuli to provide. An appropriate one of the external stimuli may be selected to encourage the visitor 252 to look towards the camera sensor 150. The appropriate external stimulus may be selected based on the context of the images and/or other data. In one example, if the behavior of the visitor 252 is determined to be a loiterer and/or a criminal, the external stimulus may be an alarm stimulus (e.g., the speaker 174 may emit a loud noise). In another example, if the behavior of the visitor 252 is determined to be a delivery person, the external stimulus may be a conversation stimulus (e.g., a pre-recorded audio may play with instructions to leave the package in the package deposit 230). Intelligently selecting the external stimulus may provide an appropriate stimulus that may have a high probability of encouraging the visitor 252 to look at the camera sensor 150. The type of external stimuli implemented may be varied according to the design criteria of a particular implementation.

The video frame 450 may be an example video frame captured after the external stimulus has been applied. The video frame 450 may be captured during a pre-determined time frame after the external stimulus STIM has been applied. In the video frame 450, the visitor 252 may be looking at the camera sensor 150 (e.g., a full frontal image of the face may be available and/or a facial image within 20 degrees of a full frontal view). For example, the video frame 450 may be one of the selected video frames 280a-280n. The intensive, real-time video analysis (e.g., the facial recognition video processing task) may be performed on the video frame 450. A detected face 452 is shown. The processor 152 and/or the cloud service 210 may be configured to compare the detected face 452 with a list of faces, features of a face and/or feature maps (e.g., stored in the database 218) to try to identify the face 452 as a particular (e.g., known) person.

The video processing tasks implemented by the processor 152 and/or the cloud service 210 may be designed to be extended. There may be architecture designed for extensibility. For example, convolutional neural network object recognition may form the basis for more advanced video processing tasks that provide more powerful features. One of the video processing tasks may be recognition and/or segmentation. The face detection 452 may be extracted from the image 450. The principles used for face detection may be extended to other features (e.g., license plate reading and/or vehicle detection). For example, the external stimulus STIM may instruct a driver to move a car (or park in another location) in order to get a better view of the license plate of the car for license plate reading.

The video processing tasks may be triggered based on suspect behaviors. For example, motion may be detected on the premises 202a. One of the smart cameras 100a may detect the stranger 252 at the access point 204a (e.g., the front door) at 10:05 am. Another of the smart cameras 100b may detect the stranger 252 at another access point 204b (e.g., at the back door) at 10:07 am. Checking multiple doors may be a trigger for a suspected behavior pattern (e.g., burglar behavior). The external stimulus STIM may automatically engage suspected burglars (e.g., provide a message such as "Hello, this is home security. Please disarm the system within 30 seconds or we will call the police."). If the visitor 252 does not look at the camera sensor 150 within a pre-determined time frame, another external stimulus may be applied (e.g., a 100 dB alarm). The smart camera 100 may automatically trigger an alarm, voice prompt, instructions to use the keypad 260 and/or the fingerprint scanner 262 to encourage the visitor 252 to look at the camera sensor 150.

If the face 452 is detected, the processor 152 and/or the cloud service 210 may identify individuals using face recognition technology. The processor 152 may attempt to perform facial recognition on partial faces and/or faces making facial expressions. However, if facial recognition is not successful on the partial face, the processor 152 may generate the stimulus to encourage and/or trick the visitor 252 to look at the camera sensor 150 (e.g., to get a full frontal view of the face 452 and/or to delay the visitor until a neutral facial expression appears). The smart camera 100 may be configured to perform an immediate and/or automatic security response. Based on the face identified, the smart camera 100 may generate the security response. In one example, a message may be delivered to the home owner via the user device 220 (e.g., a text message such as, "BACK YARD: SUSAN just came to the door!").

In some embodiments, the facial recognition may be used as part of the neighborhood network 202a-202n to tag burglars and/or share images of intruders with neighbors. For example, the person 252 may be detected, the face 452 may be matched to a blacklist (e.g., a list of known criminals), and the security response may be to sound the alarm and/or notify the receptionist 212 (e.g., notify the monitoring center). In some embodiments, the facial recognition may be used to contact the authorities 214 automatically when the burglar on the blacklist is recognized.

In some embodiments, the security response may be neighbor notifications. In one example, a child living at the home 202a may be visiting a friend living at the home 202i. The child 252 may be identified using the smart camera 100a of the home 202a at the front door. The face 252 of the child 252 may be recognized and a notification may be sent to the user device 220 of the parent (e.g., a text message such as, "Someone just left the house!" at 3:35 pm). When the child arrives at the home 202i, the face 452 of the child 252 may be recognized by the smart camera 100a of the home 202i. The security response may be shared by the homeowner of the home 202i to the parent of the child 252 of the home 202a. For example, the security response may be a text message such as "FRONT DOOR [shared by Frederick], Alexander is at the door!" at 3:45 pm. The network neighborhood 202a-202n may enable people to send kids to visit friends and get notified when they arrive.

Figure 8:
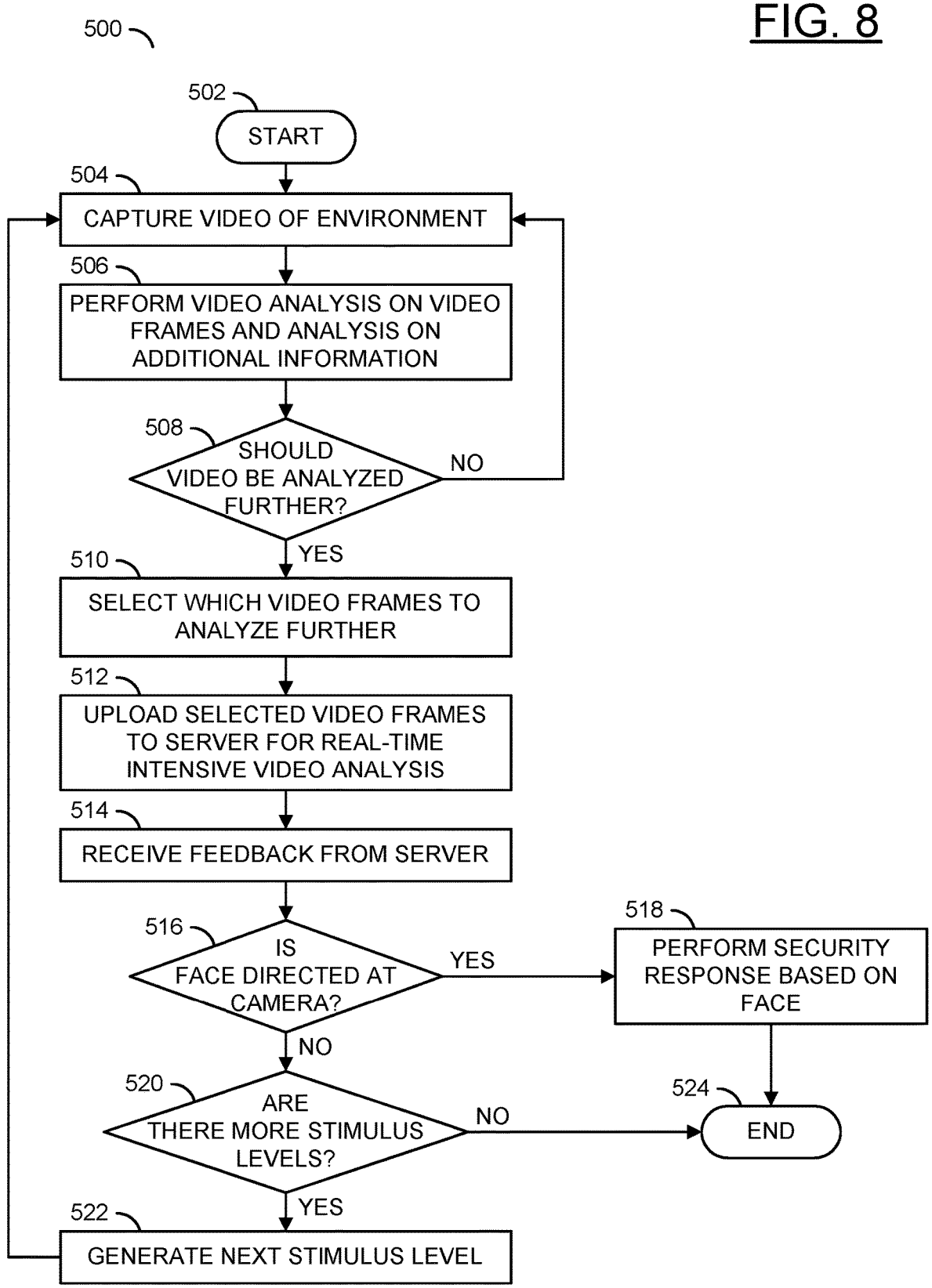
FIG. 8 is a flow diagram illustrating a method for generating an external stimulus.

Referring to FIG. 8, a method (or process) 500 is shown. The method 500 may generate an external stimulus. The method 500 generally comprises a step (or state) 502, a step (or state) 504, a step (or state) 506, a decision step (or state) 508, a step (or state) 510, a step (or state) 512, a step (or state) 514, a decision step (or state) 516, a step (or state) 518, a decision step (or state) 520, a step (or state) 522, and a step (or state) 524.

The state 502 may start the method 500. In the state 504, one or more of the smart cameras 100a-100n (e.g., using respective cameras sensors 150) may capture video of the environment (e.g., the area of interest). Next, in the state 506, the processor 152 may perform video analysis on the video frames 400a-400n and/or analysis on additional information. For example, the additional information may comprise context and/or other sensor readings (e.g., motion from the IR sensor 166, audio received from the microphone 164, etc.). Next, the method 500 may move to the decision state 508.

In the decision state 508, the processor 152 may determine whether the video should be analyzed further. In an example, the processor 152 may determine that the detected object 402 is the person 252 in a particular sequence of video frames 400a-400n (e.g., the particular sequence of video frames should be analyzed because of a likelihood that the face 452 may be detected when the person 252 is present). If the processor 152 determines not to analyze the video further, the method 500 may return to the state 504. If the processor 152 determines that the video should be analyzed further, the method 500 may move to the state 510.

In the state 510, the processor 152 may select which of the video frames 400a-400n to analyze further (e.g., the time stamped selected video frames 280a-280n). Next, in the state 512, at least one of the smart cameras 100a-100n (e.g., using the communication module and antenna 162a-162b) may upload the selected video frames 280a-280n to the server 210 for real-time intensive video analysis. In the state 514, at least one of the smart cameras 100a-100n may receive feedback (e.g., the signals CAMFB_A-CAMFB_N) from the server 210. Next, the method 500 may move to the decision state 516.

In the decision state 516, the processor 152 may determine whether the face 452 of the person 252 is directed at one of the smart cameras 100a-100n (e.g., looking at the lens module 110 and/or enough of the face 452 is visible in the video frames to perform facial recognition). If the face 452 is directed at the camera, the method 500 may move to the state 518. In the state 518, the processor 152 may generate the control signals to perform the security response based on the detected face 452. Next, the method 500 may move to the state 524. In the decision state 516, if the face 452 is not directed at the camera, the method 500 may move to the decision state 520.

In the decision state 520, the processor 152 may determine whether there are more stimulus levels. For example, the smart camera 100 may perform one or more types of stimuli to encourage the person 252 to look at the lens module 110 and/or to trick the person 252 to look at the lens module 110. If there are more stimulus levels, the method 500 may move to the state 522. In the state 522, the processor 152 and/or the power adapter 176 may generate the control signal(s) to generate the next stimulus level. Next, the method 500 may return to the state 504. In the decision state 520, if there are not more stimulus levels, the method 500 may move to the state 524. The state 524 may end the method 500.

Figure 9:
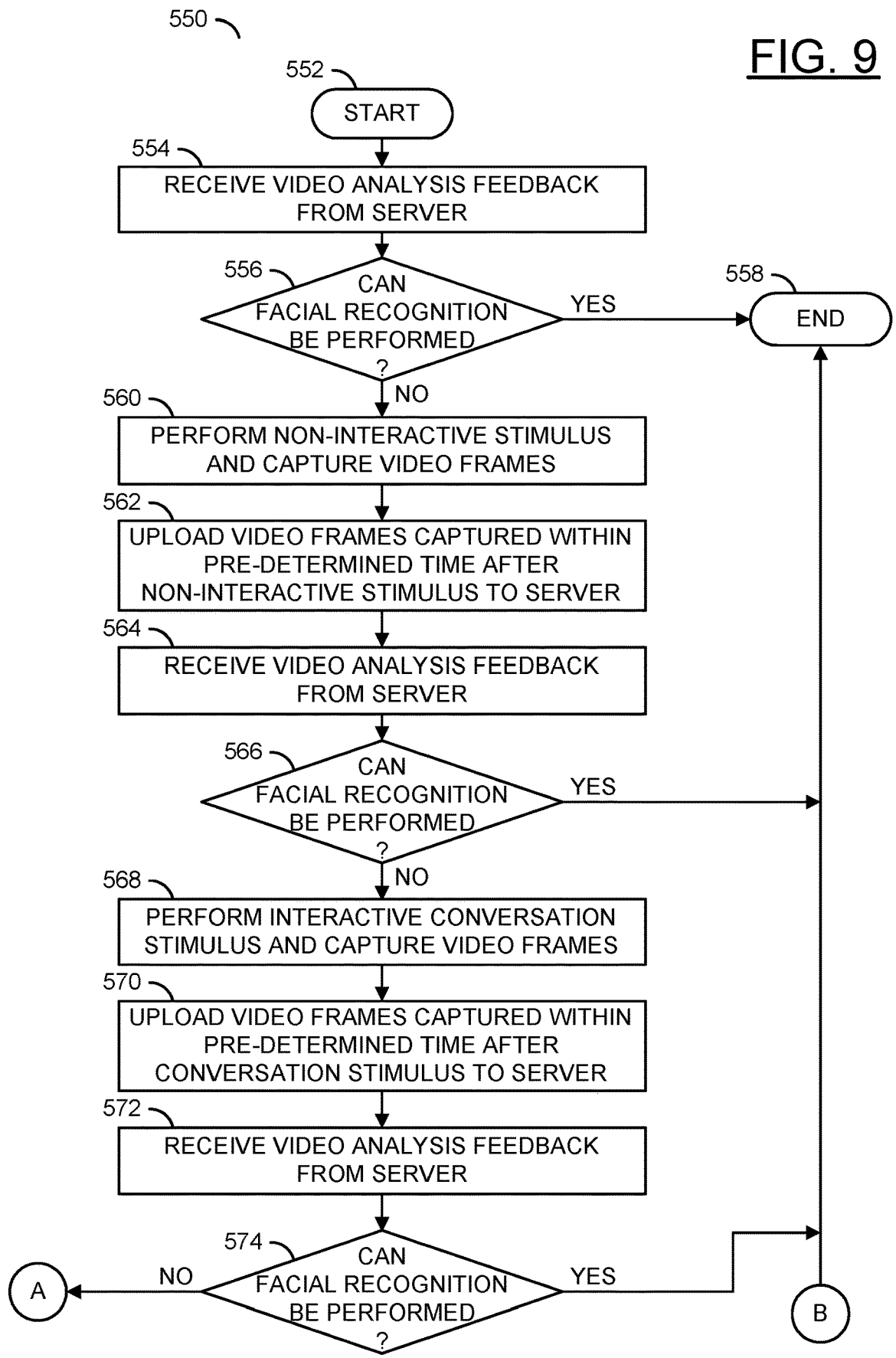
FIG. 9 is a flow diagram illustrating a method for generating a non-interactive stimulus and a conversation stimulus.

Referring to FIG. 9, a first portion of a method (or process) 550 is shown. The first portion of the method 550 may generate a non-interactive stimulus and a conversation stimulus. The first portion of the method 550 generally comprises a step (or state) 552, a step (or state) 554, a decision step (or state) 556, a step (or state) 558, a step (or state) 560, a step (or state) 562, a step (or state) 564, a decision step (or state) 566, a step (or state) 568, a step (or state) 570, a step (or state) 572, and a decision step (or state) 574.

The state 552 may start the method 550. In the state 554, the smart cameras 100a-100n may receive video analysis feedback (e.g., the signals CAMFB_A-CAMFB_N) from the server 210. The feedback may be provided to improve local facial recognition (e.g., performed by the processor 152) and/or calibrate other detection devices (e.g., the motion detected using the IR sensor 166). Next, the method 550 may move to the decision state 556.

In the decision state 556, the processor 152 may determine whether facial recognition may be performed. For example, the facial recognition may be performed if the face of the person 252 is directed at the lens module 110. If the facial recognition may be performed, the method 550 may move to the state 558. The state 558 may end the method 550. In the decision state 556, if the facial recognition may not be performed (e.g., the person 252 is not looking in the direction of the camera sensor 150 and/or is making a facial expression), the method 550 may move to the state 560.

In the state 560, the processor 152 may generate control signals to enable the smart cameras 100a-100n to perform the non-interactive stimulus and/or capture and store the video frames 400a-400n. For example, the non-interactive stimulus may be generated to encourage the visitor 252 to look at the camera sensor 150 such as generating a greeting, playing music and/or turning on the light bulb 106. Next, in the state 562, the smart cameras 100a-100n may upload to the server 210 (e.g., using the signals SF_A-SF_N) the selected frames 280a-280n captured within a pre-determined amount of time after the non-interactive stimulus. In the state 564, the smart cameras 100a-100n may receive video analysis feedback (e.g., the signals CAMFB_A-CAMFB_N) from the server 210 (e.g., may indicate whether the face has been detected and/or recognized). Next, the method 550 may move to the decision state 566.

In the decision state 566, the processor 152 may determine whether facial recognition may be performed. If the facial recognition may be performed, the method 550 may move to the state 558. If the facial recognition may not be performed, the method 550 may move to the state 568.

In the state 568, the processor 152 and/or the power adapter 176 may generate control signals to enable the smart cameras 100a-100n and/or the external devices to perform the interactive conversation stimulus and/or capture and store the video frames 400a-400n. For example, the interactive conversation stimulus may comprise initiating a conversation using the speaker 174 and/or the microphone 164. Next, in the state 570, the smart cameras 100a-100n may upload to the server 210 (e.g., using the signals SF_A-SF_N) the selected frames 280a-280n captured within a pre-determined amount of time after the interactive conversation stimulus. In the state 572, the smart cameras 100a-100n may receive video analysis feedback (e.g., the signals CAMFB_A-CAMFB_N) from the server 210. Next, the method 550 may move to the decision state 574.

In the decision state 574, the processor 152 may determine whether facial recognition may be performed. If the facial recognition may be performed, the method 550 may move to the state 558. If the facial recognition may not be performed, the method 550 may move to the state 576. The state 576 may be described in association with FIG. 10.

Figure 10:
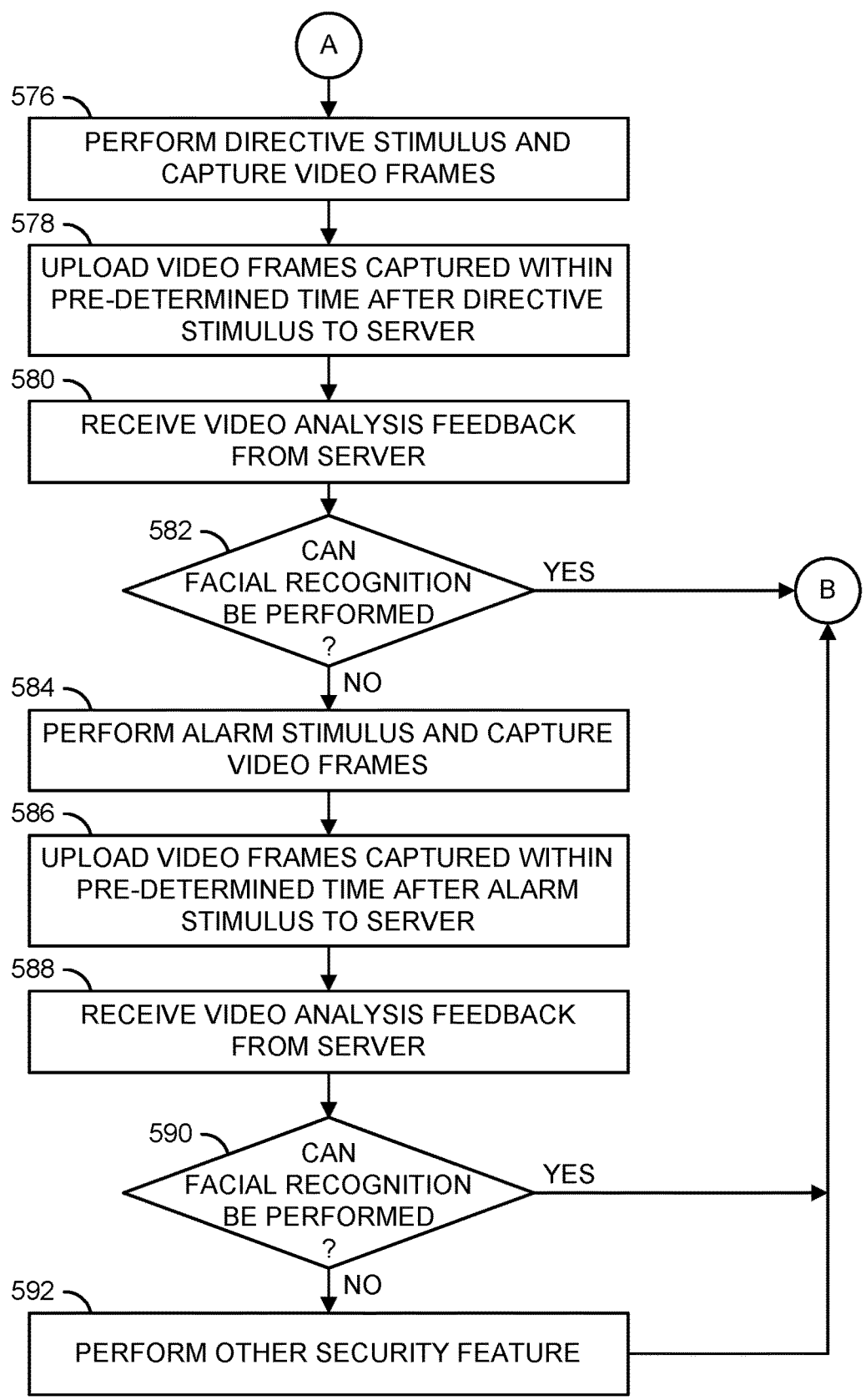
FIG. 10 is a flow diagram illustrating a method for generating a directive stimulus and an alarm stimulus.

Referring to FIG. 10, a second portion of the method 550 is shown. The second portion of the method 550 may generate a directive stimulus and an alarm stimulus. The second portion of the method 550 generally comprises a step (or state) 576, a step (or state) 578, a step (or state) 580, a decision step (or state) 582, a step (or state) 584, a step (or state) 586, a step (or state) 588, a decision step (or state) 590, and a step (or state) 592.

In the state 576, the processor 152 and/or power adapter 176 may generate control signals to enable the smart cameras 100a-100n and/or external devices to perform the directive stimulus and/or capture and store the video frames 400a-400n. For example, the directive stimulus may provide instructions (e.g., audio instructions) for pressing a combination on the keypad 260 and/or looking at the retinal scanner 262. Next, in the state 578, the smart cameras 100a-100n may upload to the server 210 (e.g., using the signals SF_A-SF_N) the selected frames 280a-280n captured within a pre-determined amount of time after the directive stimulus. In the state 580, the smart cameras 100a-100n may receive video analysis feedback (e.g., the signals CAMFB_A-CAMFB_N) from the server 210. Next, the method 550 may move to the decision state 582.

In the decision state 582, the processor 152 may determine whether facial recognition may be performed. If the facial recognition may be performed, the method 550 may move to the state 558 (shown in association with FIG. 9). If the facial recognition may not be performed, the method 550 may move to the state 584.

In the state 584, the processor 152 and/or the power adapter 176 may generate control signals to enable the smart cameras 100a-100n and/or external devices to perform the alarm stimulus and/or capture and store the video frames 400a-400n. For example, an alarm stimulus may have a dual function of catching the visitor 252 off-guard by making a surprise noise (e.g., people often react to sound by looking at the audio source) and causing the visitor 252 to flee). Next, in the state 586, the smart cameras 100a-100n may upload to the server 210 (e.g., using the signals SF_A-SF_N) the selected frames 280a-280n captured within a pre-determined amount of time after the alarm stimulus. In the state 588, the smart cameras 100a-100n may receive video analysis feedback (e.g., the signals CAMFB_A-CAMFB_N) from the server 210. Next, the method 550 may move to the decision state 590.

In the decision state 590, the processor 152 may determine whether facial recognition may be performed. If the facial recognition may be performed, the method 550 may move to the state 558 (shown in association with FIG. 9). If the facial recognition may not be performed, the method 550 may move to the state 592. In the state 592, the smart cameras 100a-100n may perform another security feature (e.g., call the authorities 214, notify neighbors, send text alerts to the owners, etc.). Next, the method 550 may move to the state 558 (shown in association with FIG. 9).

Figure 11:
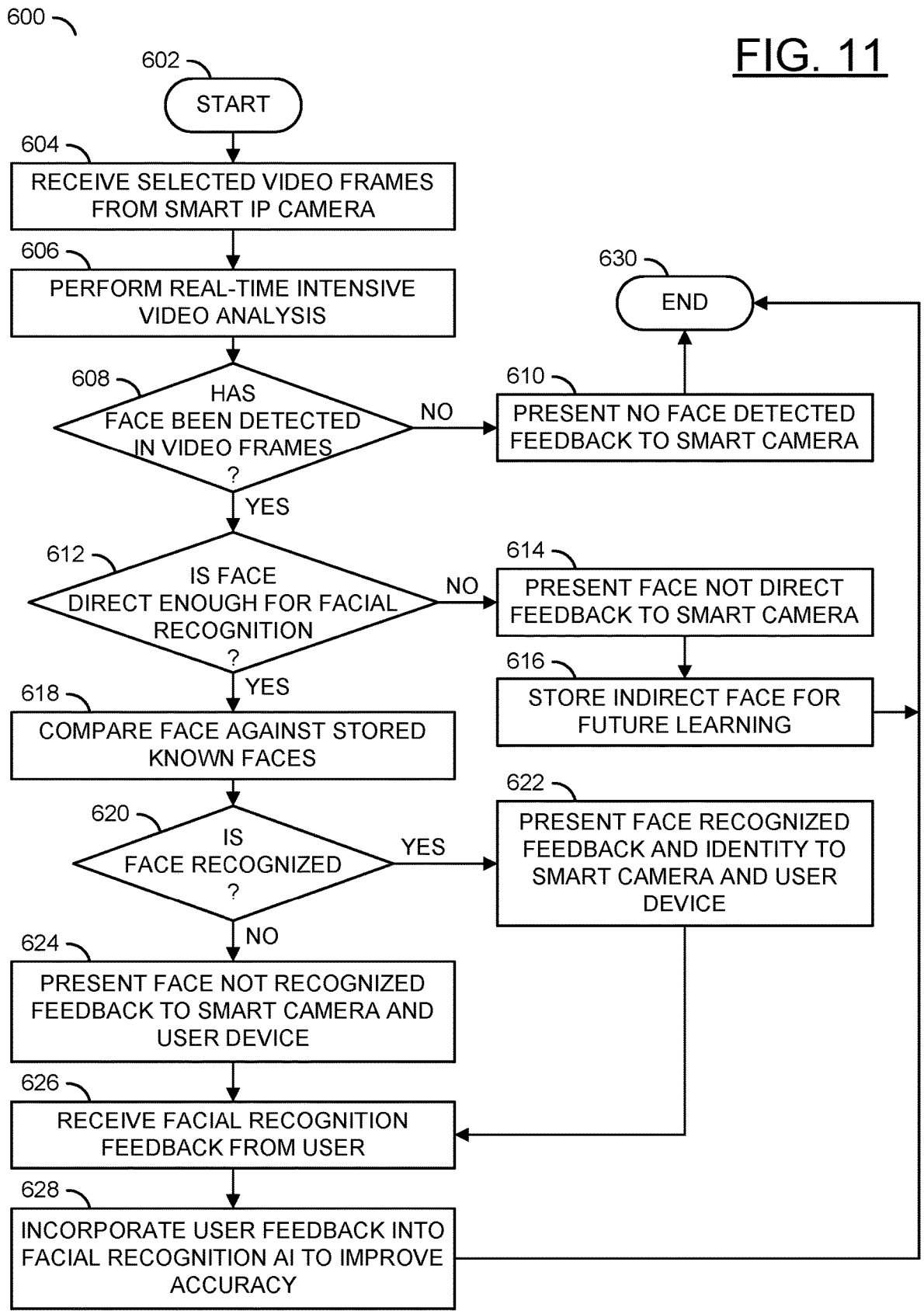
FIG. 11 is a flow diagram illustrating a method for sending and receiving feedback based on real-time intensive video analysis.

Referring to FIG. 11, a method (or process) 600 is shown. The method 600 may send and receive feedback based on real-time intensive video analysis. The method 600 generally comprises a step (or state) 602, a step (or state) 604, a step (or state) 606, a decision step (or state) 608, a step (or state) 610, a decision step (or state) 612, a step (or state) 614, a step (or state) 616, a step (or state) 618, a decision step (or state) 620, a step (or state) 622, a step (or state) 624, a step (or state) 626, a step (or state) 628, and a step (or state) 630.

The state 602 may start the method 600. In the state 604, one of the servers 300a-300n may receive the selected video frames 280a-280n from one of the smart cameras 100a-100n. In the state 606, the servers 300a-300n may perform real-time, intensive video analysis on the selected video frames 280a-280n. For example, the real-time intensive video analysis may be performed within 10 ms using the scalable processing capability of the cloud server 210. Next, the method 600 may move to the decision state 608.

In the decision state 608, the model evaluation 302 and/or the model selection 304 may determine whether the face 452 has been detected in the selected video frames 280a-280n (e.g., use feature maps and/or analyze and compare pixels of the selected video frames 280a-280n). If the face 452 has not been detected, the method 600 may move to the state 610. In the state 610, the servers 300a-300n may present a no face detected feedback to the smart cameras 100a-100n using the signals CAMFB_A-CAMFB_N. Next, the method 600 may move to the state 630. In the decision state 608, if the face 452 has been detected, the method 600 may move to the decision state 612.

In the decision state 612, the model evaluation 302 and/or the model selection 304 may determine whether the face 452 is directed enough for facial recognition (e.g., determine whether a front of the face 452 can be detected). If not, the method 600 may move to the state 614. In the state 614, the servers 300a-300n may present feedback to the smart cameras 100a-100n (e.g., via the signals CAMFB_A-CAMFB_N) indicating that the face 452 is not directly facing the lens module 110 (e.g., not within a range of angles from which facial recognition may be successful). Next, in the state 616, the servers 300a-300n may store the video frames and/or feature maps for the indirect face (e.g., in the storage 320a-320n) for future learning and/or training. Next, the method 300 may move to the state 630. In the decision state 612, if the face is direct enough for facial recognition, the method 600 may move to the state 618.

In the state 618, the servers 300a-300n, the model evaluation 302 and/or the model selection 304 may compare the detected face 452 against known faces stored in the storage 320a-320n. Next, the method 600 may move to the decision state 620. In the decision state 620, the servers 300a-300n, the model evaluation 302 and/or the model selection 304 may determine whether the face 452 is recognized. If the face 452 is recognized, the method 600 may move to the state 622. In the state 622, the servers 300a-300n may present feedback to the smart cameras 100a-100n (e.g., via the signals CAMFB_A-CAMFB_N) and/or the user devices 220a-220n (e.g., via the signals FR_A-FR_N) indicating that the face 452 has been recognized and/or the identity associated with the face 452. Next, the method 600 may move to the state 626.

In the decision state 620, if the face 452 is not recognized, the method 600 may move to the state 624. In the state 624, the servers 300a-300n may present feedback to the smart cameras 100a-100n (e.g., via the signals CAMFB_A-CAMFB_N) and/or the user devices 220a-220n (e.g., via the signals FR_A-FR_N) indicating that the face 452 is not recognized). Next, the method 600 may move to the state 626. In the state 626, the servers 300a-300n may receive facial recognition feedback from the user devices 220a-220n (e.g., via the signals FBU_A-FBU_N). Next, in the state 628, the servers 300a-300n, the model evaluation 302 and/or the model selection 304 may incorporate the user feedback into the facial recognition AI to improve accuracy (e.g., training data and/or adjusting weights). Next, the method 600 may move to the state 630. The state 630 may end the method 600.

Figure 12:
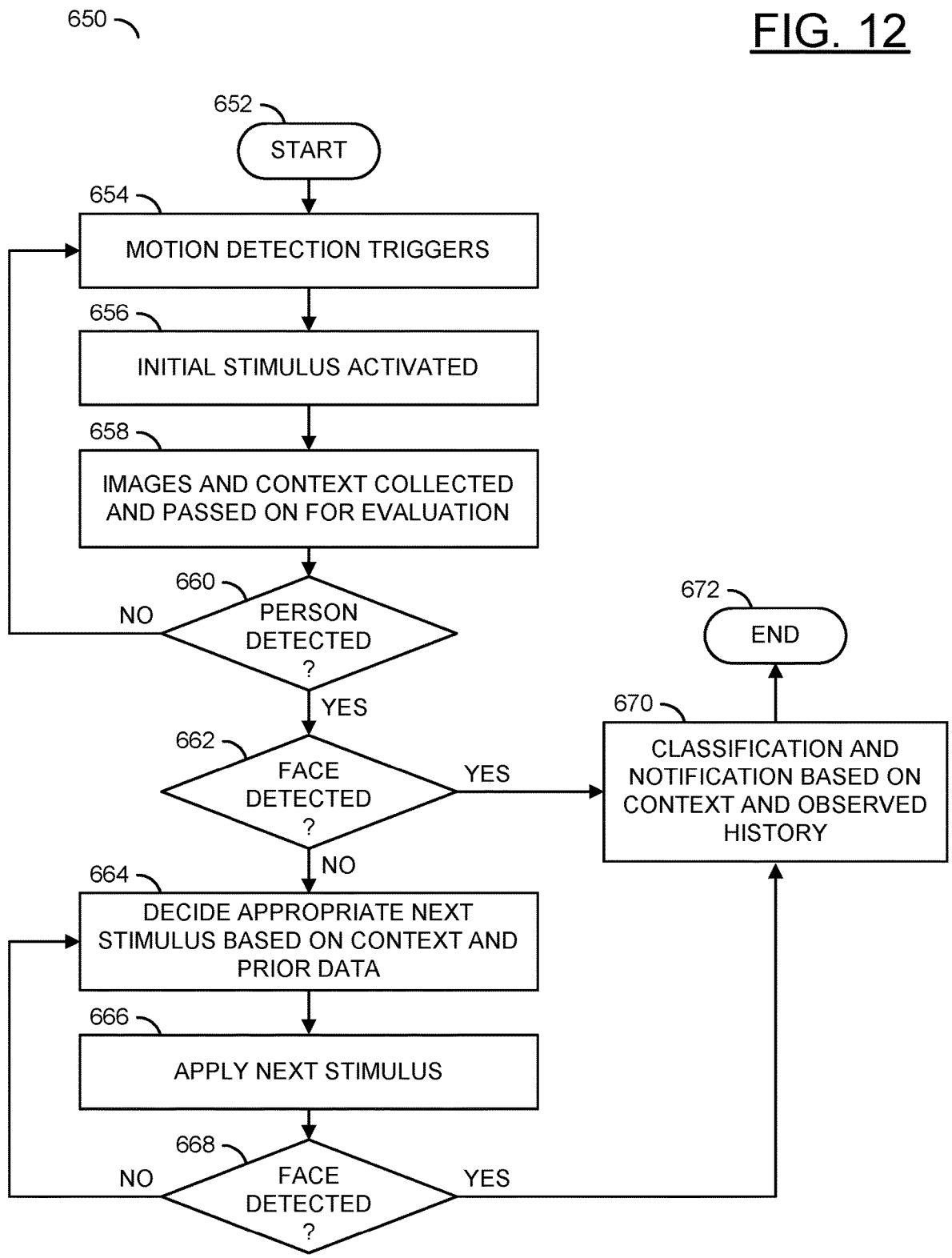
FIG. 12 is a flow diagram illustrating a method for intelligently determining which stimulus to generate.

Referring to FIG. 12, a method (or process) 650 is shown. The method 650 may intelligently determine which stimulus to generate. The method 650 generally comprises a step (or state) 652, a step (or state) 654, a step (or state) 656, a step (or state) 658, a decision step (or state) 660, a decision step (or state) 662, a step (or state) 664, a step (or state) 666, a decision step (or state) 668, a step (or state) 670, and a step (or state) 672.

The state 652 may start the method 650. In the state 654, the motion detection may be triggered. For example, the IR sensor 166 may detect motion. Next, in the state 656, the smart cameras 100a-100n may activate the initial stimulus. For example, the initial stimulus may be a default setting and/or a user selected setting. In the state 658, the images and/or context may be collected and passed on for evaluation. For example, the images and/or context may be the selected video frames 280a-280n captured within a short amount of time after the stimulus has been activated. The processor 152 may be configured to evaluate the selected video frames 280a-280n. Next, the method 650 may move to the decision state 660.

In the decision state 660, the processor 152 may determine whether the person 252 has been detected. If not, the method 650 may return to the state 654. If the person 252 has been detected, the method 650 may move to the decision state 662. In the decision state 662, the processor 152 may determine whether the face 452 of the person 252 has been detected. If the face 452 has been detected, the method 650 may move to the state 670. If not, the method 650 may move to the state 664.

In the state 664, the processor 152 may determine the appropriate next stimulus based on the context and/or the prior data. For example, the prior data may comprise detected behavior and/or previous detections, clothing, a vehicle make a vehicle model, etc. In the state 666, the processor 152 may apply the next stimulus (e.g., the power adapter 176 may generate the appropriate control signals to activate the component(s) used to generate the stimulus). Next, the method 650 may move to the decision state 668.

In the decision state 668, the processor 152 may determine whether the face 452 may be detected in the selected video frames 280a-280n after the stimulus (e.g., by generating an alarm, a conversation, a flashing light, etc.). If the face 452 may not be detected, the method 650 may return to the state 664. If the face 452 may be detected, the method 650 may move to the state 670. In the state 670, the processor 152 may perform a classification and/or notification based on the context and/or observed history. Next, the method 650 may move to the state 672. The state 672 may end the method 650.

The stimulus may be intelligently selected by the processor 152 based on the contextual information. In some embodiments, the processor 152 may not implement a straightforward flow of a simple stimulus (e.g., a chime), more advanced stimulus (e.g., a voice), and then a complex stimulus (e.g., a conversation). For example, the processor 152 may select the best stimulus based on the information available. In some embodiments, detecting a person may be used as a filter for determining the selected video frames 280a-280n (e.g., no face image would be available unless a person is detected first).

Figure 13:
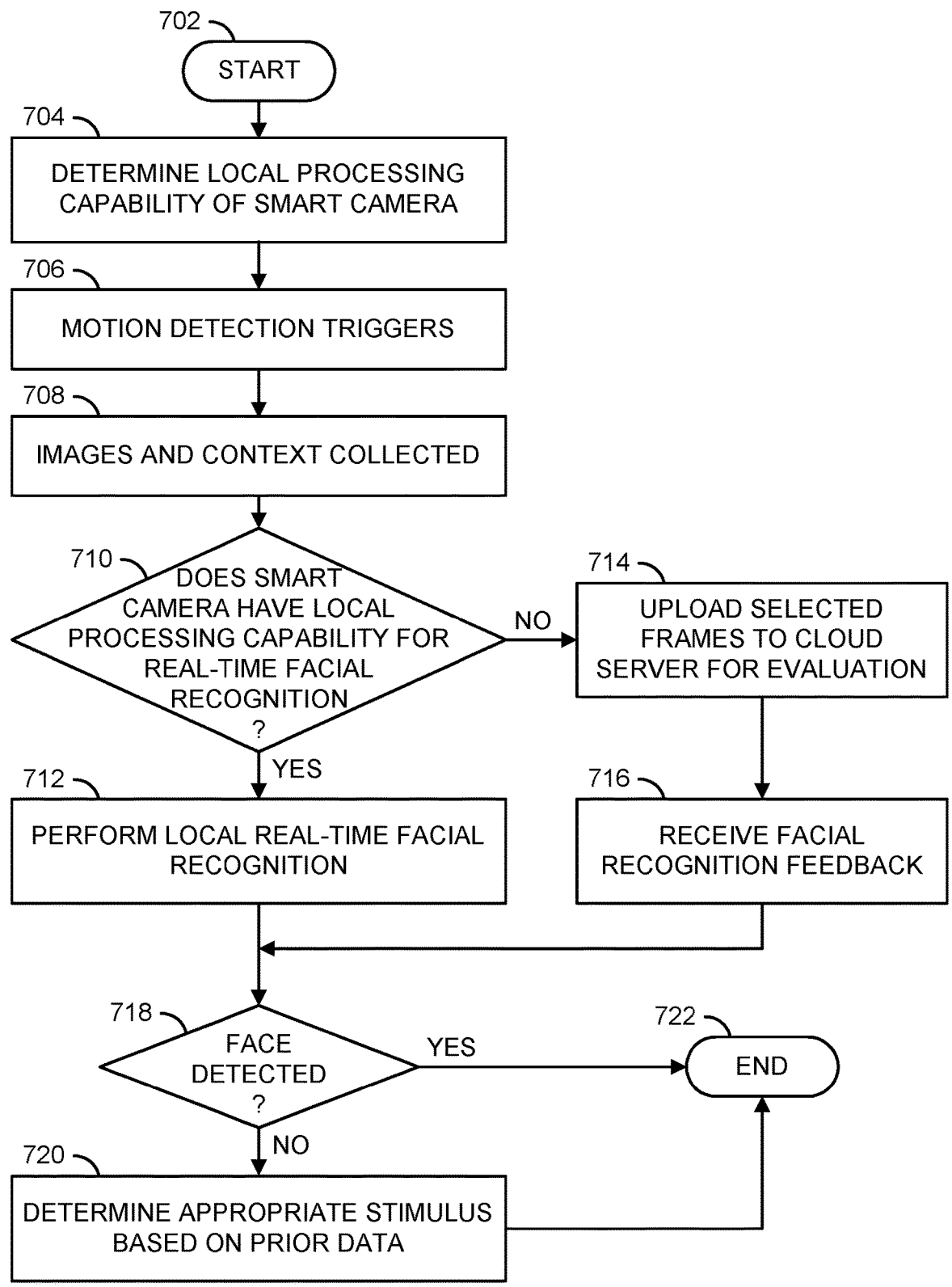
FIG. 13 is a flow diagram illustrating a method for performing local video analysis.

Referring to FIG. 13, a method (or process) 700 is shown. The method 700 may perform local video analysis. The method 700 generally comprises a step (or state) 702, a step (or state) 704, a step (or state) 706, a step (or state) 708, a decision step (or state) 710, a step (or state) 712, a step (or state) 714, a step (or state) 716, a decision step (or state) 718, a step (or state) 720, and a step (or state) 722.

The state 702 may start the method 700. Next, in the state 704, the processor 152 may determine the local processing capability of the smart camera 100. For example, the smart camera 100 may be configured to perform a self-diagnostic and/or benchmark to determine capabilities of various components (e.g., the processor 152, the memory 154, etc.). In another example, firmware of the smart camera 100 may enable and/or disable particular features. For example, the processor 152 may be configured to perform some object detection (e.g., to determine that an object is a person) but may not be able to perform facial recognition in real-time. In the state 706, the motion detection may be triggered. For example, the IR sensor 166 may detect motion. In the state 708, the images and/or context may be collected by the smart camera 100. Next, the method 700 may move to the decision state 710.

In the decision state 710, the processor 152 may determine whether the smart camera 100 has the local processing capability for real-time facial recognition. For example, real-time facial recognition may be within approximately 500 ms. If the processor does have the capability, the method 700 may move to the state 712. In the state 712, the processor 152 may perform local real-time facial recognition. Next, the method 700 may move to the decision state 718. In the decision state 710, if the processor does not have the capability, the method 700 may move to the state 714. In the state 714, the smart camera 100 may upload the selected video frames 280a-280n to the cloud server 210 for evaluation. Next, in the state 716, the smart camera 100 may receive the facial recognition feedback (e.g., the signal CAMFB). Next, the method 700 may move to the decision state 718.

In the decision state 718, the processor 152 may determine whether the face 452 has been detected. If the face has not been detected, the method 700 may move to the state 720. In the state 720, the processor 152 may determine the appropriate stimulus based on the prior data (e.g., from the memory 154). For example, the prior data may comprise behavior, context, a detected uniform, a time of day, etc. Next, the method 700 may move to the state 722. In the decision state 718, if the face has been detected, the method 700 may move to the state 722. The state 722 may end the method 700.

Implementing the external stimulus STIM may increase the chances of capturing a video frame having a good face shot of the person 252 (e.g., high-quality image, looking directly and/or nearly directly at the camera sensor 150, neutral facial expression, etc.). Selecting the appropriate external stimulus based on the context may provide a guide for where and when in the captured images 400a-400n to search for the face. Having a guidance as to when and where to search may speed up the time for making a decision. For example, since the smart camera 100 may know when the external stimulus may likely get the best face shots, the selected frames 280a-280n may be used to enable the facial recognition video processing task to look at the images related to the stimulus first. For example, after the stimulus is generated, the video frames 400a-400n within approximately 30 seconds may have an increased likelihood of capturing a suitable image of a face for performing facial recognition. The selected video frames 280a-280n may comprise a time stamp for tracking a time of when the object and/or face has been detected.

Based on the observed behavior of the person 252 and other data (e.g., context data, motion, etc.), the smart camera 100 may select the external stimulus intelligently to get the best information. For example, based on the time of day and/or knowledge about the whereabouts of the homeowner, the smart camera 100 may decide to gently engage in dialog with the visitor 252 (e.g., using an artificial intelligence bot). In another example, if the camera system 100 knows that there may be suspicious people around and the homeowner is not around then the best external stimulus may be to directly use the alarm. Which external stimulus is selected may be flexible and change depending on the context.

The smart camera 100 may be configured to make decisions quickly and accurately, both in terms of what stimulus to activate as well as the final classification of the person 252. The smart camera 100 may implement a pipeline. Some of the components (or modules) of the pipeline may operate in the cloud services 210, and some components (or modules) may operate locally on the smart camera 100. Which modules of the pipeline operate where may not be fixed (e.g., processing tasks may shift depending on the computing power of the smart camera 100). In some embodiments, the components of the smart camera 100 may mostly perform simple motion detection and/or send up captured images (e.g., the selected frames 280a-280n) to the cloud server 210 and the cloud server 210 may perform the rest of the video processing tasks. As technology advances, some parts of the video processing tasks (e.g., the person detection and/or the face detection) may be done locally by the smart camera 100.

The entirety of the information collected (e.g., whether the detected person 252 responded to the initial stimulus or not, what stimulus was chosen, how the person 252 responded to each stimulus, etc.) may be used in the classification process to determine whether the person 252 is a friendly visitor, a loiterer, a solicitor, a delivery person, a potential burglar, etc. The feedback (e.g., the signal FBU from the user device 220) may be used to improve selection of the stimulus STIM and/or the classification of the recognized object 402. The classification may learn based on user correction (e.g., confirming that an identified person was indeed a solicitor, providing a correction that the detected burglar was actually a resident, etc.). The stimulus selection decision by the processor 152 may also learn (e.g., improve and/or refine) over time. For example, based on historical data that has been corrected and/or verified (e.g., based on feedback) the processor 152 may learn when to trigger the stimulus and/or which stimulus to select to get the best views of faces. For example, waiting until the detected motion is closer to the camera sensor 150 before triggering the stimulus may provide a better look at the face.

At least four different types of stimuli may be implemented by the smart camera 100. The different types of stimuli may be implemented to greet the visitor 252 and/or encourage the visitor 252 to look directly at the camera sensor 150 at a pre-determined time. Implementing different types of stimuli may ensure that the visitor 252 does not expect the stimuli. For example, if the person 252 has visited before and heard the stimulus, the person 252 may be more likely to choose to ignore the stimulus and avoid looking at the camera sensor 150. If repeat visitors do not look at the camera sensor 150 then the useful information from the good facial images may be difficult to obtain. For the external stimulus to work well, the signal STIM may enable unique and/or custom designed stimulus for a particular one of the entrances 204a-204n.

One type of stimulus may be a non-interactive stimulus. The non-interactive stimulus may be a stimulus that attempts to draw the attention of the visitor 252 towards the camera sensor 150 without requesting any other reaction from the visitor 252. For example, the non-interactive stimulus may comprise a simple chime, a dog barking and/or a voice from the speaker 174. Since most people react to an unexpected sound, the non-interactive stimulus may usually encourage the visitor to look at the camera sensor 150. In some embodiments, the non-interactive stimulus may be turning on the light bulb 106 and/or flickering the light bulb 106 (e.g., unexpected flashes may draw attention). The images 400a-400n taken shortly after the non-interactive stimulus (e.g., after approximately 0.5 seconds) may likely have good face images, especially if the visitor 252 is new to the building. The images taken shortly after the non-interactive stimulus may be used as the selected video frames 280a-280n.

Another type of external stimulus may be an interactive stimulus. The interactive stimulus may comprise a conversation (e.g., with or without AI technology). In some embodiments, the artificial intelligence may be configured to select from pre-recorded audio and/or generate audio to playback using the speaker 174. The audio selected by the artificial intelligence may be used to initiate a conversation with the visitor 252. The visitor 252 may respond via the microphone 164. In some embodiments, the microphone 164 may not record what the visitor 252 responds (e.g., the conversation may be immaterial, but instead used to encourage the visitor 252 to look towards the lens module 110). In one example, the interactive stimulus may be a simple conversation between a homeowner and the visitor 252 (e.g., loiterer, solicitor and/or burglar that wants to find out if someone is in the building 202). The two-way radio functionality of the smart camera 100 may enable a conversation between the homeowner (e.g., using the user device 220) and the visitor 252 (e.g., using the microphone 164).

In some embodiments, the interactive stimulus may use AI technology to provide an automated conversation. For example, when the person 252 is detected, a simple automatic greeting such as "Hi, how are you?" may get the visitor 252 to look at the camera sensor 150. Generally, people look at what they are talking to, even if not talking to a real person. For example, the artificial intelligence may be configured to ask trivial questions (e.g., "What is your name?", "How long have you been waiting?", "How is the weather?", etc.) and/or ask for a password (e.g., even if no password exists) and/or make announcements. For example, the artificial intelligence may be configured to trick the visitor 252 into facing the camera sensor 150. Image captured shortly after the interactive stimulus may be used as the selected video frames 280a-280n that may likely have a good face. After a few seconds, if the person 252 is still detected in the field of view of the camera sensor 150, a second automatic voice message may be interactive such as, "Can I help you?" with both video and audio recorded by the smart camera 100. A few seconds after the second voice message if there is no voice being recorded, a third automatic voice message may continue the interaction, such as, "Sorry we are not interested".

The images captured after each of the interactions may be used as the selected video frames 280a-280n. When AI technology is deployed to analyze the voice of the visitor 252, each automatic voice message from the system may increase the probability of getting a good face image of the visitor 252. In one example, the smart camera 100 and/or the receptionist 212 may ask, "Can I help you?", which may cause the person 252 to look at the camera sensor 150. The images half a second after the voice message may likely have a good face image to be used as the selected video frames 280a-280n. If the automatic "receptionist" encourages the visitor 252 to engage in a conversation, each exchange of dialog may generate more face images.

Another type of stimulus may be a directive stimulus. The directive stimulus may ask the visitor 252 to perform a task that involves making the visitor 252 face the camera sensor 150. In one example, the directive stimulus may ask the visitor 252 to press a doorbell button that is near the camera sensor 150. In another example, the directive stimulus may ask the visitor 252 to enter a code on the keypad 260 that is near the camera sensor 150. In yet another example, the directive stimulus may ask the visitor 252 to provide a finger print on the scanner device 262 near the camera sensor 150. In still another example, the directive stimulus may ask the visitor 252 to provide a retinal scan using the scanner device 262 near the camera sensor 150.

The purpose given by the directive stimulus may be to unlock the entrance during a particular time frame. In some embodiments, the code may be a fake (e.g., dummy) code that does not work and/or the fingerprint/retina scanner may be non-functional and merely encourages the visitor 252 to face the camera sensor 150 to provide a good position for a face recognition shot. In yet another example, the directive stimulus may ask the visitor 252 to talk close to the microphone 164 that may be near the camera sensor 150. In still another example, the directive stimulus may ask the visitor 252 to look at the camera sensor 150 so that the visitor 252 may be identified. The face detection video processing task may determine if the visitor 252 complies with the request of the directive stimulus, and the information captured may be useful to identify the visitor 252 and/or the intentions of the visitor 252 (e.g., an uncooperative visitor may have bad intentions).

In some embodiments, the external stimulus STIM may be an alert stimulus. In one example, the alert stimulus may be a distress signal. In another example, the alert stimulus may be an unexpected sound intended to shock the visitor 252. An unexpected and/or loud sound may encourage the visitor 252 to look at the source of the sound. The sound may be generated by the smart camera 100 and/or an external device and the visitor 252 may look at the camera sensor 100 in response to the sound. The alert stimulus may be implemented as a loud siren, a strobe light, a human/animal distress voice, etc. The images 400a-400n captured shortly after the alert stimulus is triggered may have a higher probability of capturing good face images of the visitor 252 (e.g., to be used as the selected video frames 280a-280n). The alert stimulus may have an alternate function of scaring away the unwanted visitor. For example, the alarm stimulus may be selected based on the context (e.g., the visitor being classified as a loiterer and/or an unwanted person may cause the alarm to sound).

The smart camera 100 and/or the system 250 may be implemented to make real-time face recognition practical at the entrances of homes and/or office buildings. At the entrances of homes and/or office buildings, the images of known visitors may be easily gathered for comparison with the visitor 252 at the entrance in real-time. If the reference image stored in the cloud service 210 matches (e.g., with very high confidence) the images of the visitor 252, entrance access may be granted. If the image stored in the cloud service 210 does not match with the images captured of the visitor 252, an alert may be sent to the authority 214.

The smart camera 100 and/or the system 250 may enables AI technology and/or machine learning to make current security systems "smart" for homes and/or office buildings. In some embodiments, the smart camera 100 may perform basic video analysis (e.g., motion detection). In some embodiments, the smart camera 100 may locally perform person detection and/or face recognition.

The smart camera 100 may provide additional information about the detected motion. For example, the smart camera 100 may determine and/or store additional information (e.g., context information) such as duration of time of continuous motion, time of day, weather condition, sound level recorded, etc. When motion and/or the person 252 is detected the additional context information may be stored. The smart camera 100 may perform video analysis on the captured video frames 400a-400n and use the context information to provide additional analysis. The smart camera 100 may determine which images to upload to the server 210 (e.g., the selected video frames 280a-280n) for intensive video analysis. If too many of the captured images 400a-400n are uploaded, the video analysis processing tasks may be slowed down (e.g., inefficient analysis using video frames with a low probability of having a face to detect). For example, slowing down the video processing tasks with too many of the images 400a-400n may render the response time to be too slow (e.g., non-real-time). If the images uploaded do not provide sufficient information (e.g., "faces are not direct enough"), then the server 210 may not recognize the face 452. In one example, real-time analysis may be less than 500 ms.

Carefully implementing the external stimulus and/or the timing for the selected video frames 280a-280n may encourage the person 252 to be positioned in the video frames 400a-400n to enable good images to be captured (e.g., face the camera sensor 150). High quality images at specific times may be uploaded to the server 210 for real-time analysis of faces (e.g., against a list of known faces). The results of the analysis may be presented to the user devices 220a-220n (e.g., as the signals FR_A-FR_N) for feedback. Users may evaluate the feedback results from the signals FR_A-FR_N (e.g., an image from the selected video frames 280a-280n may be provided with a caption such as: "no face images detected", "face not recognized", "face recognized as John", etc.). The users may provide feedback from the user devices 220a-220n (e.g., as the signals FBU_A-FBU_N). The user feedback may evaluate the results generated by the facial recognition video processing task (e.g., selecting provided options such as: correct, wrong, a different name of the person associated with the face, etc.). The user feedback may be included in the AI/learning process for future application. The feedback loop may be useful for machine learning (e.g., deep learning, convoluted neural network, etc.) to improve accuracy.

In some embodiments, the smart cameras 100a-100n implemented at the premises 202 may be configured as companion cameras. In one example, each of the companion smart cameras 100a-100n may have the same functionality and/or processing capability. In another example, one of the companion smart cameras 100a-100n may be implemented as a primary camera having greater processing, storage and/or communication capabilities than the other (e.g., secondary) companion smart cameras 100a-100n (e.g., the secondary companion smart cameras 100a-100n may be battery operated or may be hard-wired). In some embodiments, the secondary companion smart cameras (e.g., 100b-100n) may be controlled by the primary companion smart camera (e.g., 100a). In an example, the primary camera 100a may implement the functionality of the server 210 (e.g., receive selected video frames 280a-280n from the companion smart cameras 100b-100n and perform the intensive, real-time video analysis using a convolutional neural network).

The companion smart cameras 100a-100n may be configured to capture the video data along with a timestamp. The video data with the timestamp may be sent by each of the companion smart cameras 100a-100n to the primary camera 100a and/or the cloud server 210. In an example, each of the companion smart cameras 100a-100n may be positioned to capture a different angle of the area of interest (e.g., the secondary companion smart cameras 100b-100n may capture a different angle than the primary companion smart camera 100a). Capturing different angles (e.g., 90 degrees, 180 degrees, etc.) of the area of interest may provide alternate vantage points of the same area at the same time. The primary companion smart camera 100a and/or the server 210 may be configured to receive the selected video frames 280a-280n from each of the companion smart cameras 100a-100n with the timestamp. Based on the timestamp, the primary companion smart camera 100a and/or the server 210 may be configured to generate a composite image from the video data captured at the same time. The composite of the selected video frames 280a-280n from the companion smart cameras 100a-100n may be used to generate a view of the front of the face of the visitor 252. The composite image may be used for facial recognition.

The functions performed by the diagrams of FIGS. 8-13 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
    a camera sensor configured to capture video data; and
    a processor configured to (A) process said video data, (B) generate control signals used to initiate a stimulus and (C) execute computer readable instructions, wherein (i) said computer readable instructions are executed by said processor to perform video analysis on video frames of said captured video data to (a) detect a person, (b) detect context information associated with said detected person and (c) determine facial recognition results of said detected person, (ii) if said facial recognition results cannot detect a face of said detected person, said processor selects said stimulus from a plurality of stimuli and (iii) said stimulus is selected in response to said context information to increase a probability of detecting a frontal view of said face of said detected person.

2. The apparatus according to claim 1, wherein said probability of detecting said frontal view of said face of said detected person is increased by encouraging said detected person to look at said camera sensor.

3. The apparatus according to claim 1, wherein said facial recognition results are determined in real-time.

4. The apparatus according to claim 3, wherein said real-time for said facial recognition results is within 500 ms.

5. The apparatus according to claim 1, wherein said processor is configured to share video processing tasks with a cloud server based on a processing capability of said processor.

6. The apparatus according to claim 5, wherein said processor and said cloud server are configured to implement a video processing pipeline with different video processing tasks performed by said processor and said cloud server.

7. An apparatus comprising:
    a camera sensor configured to capture video data; and
    a processor configured to (A) process said video data, (B) generate control signals used to initiate a stimulus and (C) execute computer readable instructions, wherein (i) said computer readable instructions are executed by said processor to (a) stream said video data to an external server, (b) receive (A) facial recognition results and (B) context information associated with a detected person from said external server corresponding to said video data and (c) select said stimulus from a plurality of stimuli, (ii) if said facial recognition results cannot detect a face of said detected person, said stimulus is selected from said plurality of stimuli and (iii) said stimulus is selected in response to said context information to increase a probability of detecting a frontal view of said face of said detected person.

8. The apparatus according to claim 7, wherein said apparatus is configured to (i) detect motion and (ii) if said motion is detected, generate said control signals to initiate said stimulus.

9. The apparatus according to claim 7, wherein person detection operations are performed by said processor to detect said detected person as a filter before facial recognition is implemented.

10. The apparatus according to claim 7, wherein (i) said video data captured during a pre-determined time after said stimulus is initiated is used as selected video frames and (ii) said selected video frames are streamed to said external server.

11. The apparatus according to claim 10, wherein (i) said selected video frames have a higher probability of having said frontal view of said face of said detected person and (ii) streaming only said selected frames increases a speed of generating said facial recognition results.

12. The apparatus according to claim 7, wherein said facial recognition results are presented to a user device for evaluation by a user.

13. The apparatus according to claim 12, wherein (i) said evaluation by said user is presented to said external server as feedback and (ii) said feedback is used to improve learning for video processing tasks.

14. The apparatus according to claim 7, wherein said external server comprises a distributed computing network configured to scale resources based on demand.

15. The apparatus according to claim 7, wherein said plurality of stimuli comprise at least one of (a) non-interactive stimulus, (b) conversation stimulus, (c) directive stimulus and (d) alarm stimulus.

16. The apparatus according to claim 15, wherein said non-interactive stimulus comprises an unexpected sound.

17. The apparatus according to claim 15, wherein said conversation stimulus comprises an interactive conversation using a two-way radio functionality of said apparatus between at least one of (i) said detected person and a homeowner, (ii) said detected person and an artificial intelligence and (iii) said detected person and a combination of said homeowner and said artificial intelligence.

18. The apparatus according to claim 15, wherein said directive stimulus comprises instructing said detected person to perform a task that comprises facing said camera sensor.

19. The apparatus according to claim 15, wherein said alarm stimulus comprises a distress signal.

20. An apparatus comprising:
a camera sensor configured to capture video data; and
a processor configured to (A) process said video data, (B) generate control signals used to initiate a stimulus and (C) execute computer readable instructions, wherein (i) said computer readable instructions are executed by said processor to perform video analysis on video frames of said captured data to (a) detect a person, (b) detect context information associated with said detected person and (c) determine whether said detected person has performed a desired response, (ii) if said desired response of said detected person has not been detected, said processor selects said stimulus from a plurality of stimuli and (iii) said stimulus that is selected has a highest probability out of said plurality of stimuli of causing said desired response from said detected person.

* * * * *